US011899112B2

(12) United States Patent
Imaki

(10) Patent No.: US 11,899,112 B2
(45) Date of Patent: Feb. 13, 2024

(54) LASER RADAR DEVICE

(71) Applicant: Mitsubishi Electric Corporation, Tokyo (JP)

(72) Inventor: Masaharu Imaki, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 970 days.

(21) Appl. No.: 16/618,303

(22) PCT Filed: Jul. 4, 2017

(86) PCT No.: PCT/JP2017/024496
§ 371 (c)(1),
(2) Date: Nov. 29, 2019

(87) PCT Pub. No.: WO2019/008670
PCT Pub. Date: Jan. 10, 2019

(65) Prior Publication Data
US 2021/0157000 A1   May 27, 2021

(51) Int. Cl.
*G01S 17/58* (2006.01)
*G01S 7/481* (2006.01)
(Continued)

(52) U.S. Cl.
CPC .............. *G01S 17/58* (2013.01); *G01S 7/487* (2013.01); *G01S 7/4812* (2013.01);
(Continued)

(58) Field of Classification Search
None
See application file for complete search history.

(56) References Cited

U.S. PATENT DOCUMENTS 6,580,497 B1 * 6/2003 Asaka ..................... G01S 7/493
356/28.5
2013/0027715 A1 * 1/2013 Imaki ..................... G01S 17/10
356/601
(Continued)

FOREIGN PATENT DOCUMENTS

CN 102890272 A * 1/2013
EP 2 896 972 A1 7/2015
(Continued)

OTHER PUBLICATIONS

English JP-2007316016-A (Year: 2007).*
(Continued)

*Primary Examiner* — Yuqing Xiao
*Assistant Examiner* — Jempson Noel
(74) *Attorney, Agent, or Firm* — Birch, Stewart, Kolasch & Birch, LLP

(57) ABSTRACT

A laser radar device (1) includes: a light source array (10) for simultaneously emitting a plurality of laser light beams from a plurality of light emitting ends; an optical modulator (12) for modulating transmission light separated from the plurality of laser light beams to generate modulated transmission light; a transmission/reception optical system (14, 15) for receiving, as received light, the modulated transmission light reflected by a target, while scanning external space with the modulated transmission light; an optical combiner (16) for generating a plurality of interference light components by combining a plurality of local light components separated from the plurality of laser light beams and the received light; an optical receiver array (17) for generating a plurality of detection signals by detecting the plurality of interference light components; a switching circuit (18) for selecting a detection signal from the plurality of detection signals in accordance with a scanning speed with respect to the external space; and a signal processor (20) for calculat- (Continued)

ing an observation quantity showing a state of the target on the basis of the selected detection signal.

2 Claims, 12 Drawing Sheets

(51) Int. Cl.
  *G01S 7/4863* (2020.01)
  *G01S 7/487* (2006.01)
  *G01S 17/95* (2006.01)
(52) U.S. Cl.
  CPC .......... *G01S 7/4815* (2013.01); *G01S 7/4817* (2013.01); *G01S 7/4863* (2013.01); *G01S 17/95* (2013.01)

(56) References Cited

U.S. PATENT DOCUMENTS

| | | | | |
|---|---|---|---|---|
| 2013/0044309 A1* | 2/2013 | Dakin | .................. | G01S 17/89 356/4.09 |
| 2014/0233013 A1* | 8/2014 | Sakimura | .............. | G01S 7/4815 356/5.01 |
| 2014/0300888 A1* | 10/2014 | Duffey | .................. | G01S 7/497 356/28 |
| 2015/0146191 A1* | 5/2015 | Kotake | .................. | G01S 17/95 356/28.5 |
| 2015/0185328 A1* | 7/2015 | Kotake | .................. | G01S 17/58 356/28.5 |
| 2017/0307648 A1 | 10/2017 | Kotake et al. | | |
| 2017/0336499 A1 | 11/2017 | Ito et al. | | |
| 2018/0231643 A1 | 8/2018 | Lee et al. | | |
| 2018/0356440 A1 | 12/2018 | Kotake et al. | | |

FOREIGN PATENT DOCUMENTS

| | | | |
|---|---|---|---|
| JP | 2007-248146 A | | 9/2007 |
| JP | 2007-316016 A | | 12/2007 |
| JP | 2007316016 A | * | 12/2007 |
| JP | 2009-162678 A | | 7/2009 |
| JP | 2016-105082 A | | 6/2016 |
| JP | 6076541 B2 | | 2/2017 |
| WO | WO 2016/092705 A1 | | 6/2016 |
| WO | WO 2016/117159 A1 | | 7/2016 |
| WO | WO 2017/010176 A1 | | 1/2017 |
| WO | WO 2017/023107 A1 | | 2/2017 |
| WO | WO 2017/098623 A1 | | 6/2017 |

OTHER PUBLICATIONS

English CN 102890272 A (Year: 2013).*
International Search Report (PCT/ISA/210) issued in PCT/JP2017/024496, dated Oct. 3, 2017.
Japanese Office Action issued in Application No. 2017-566166, dated Mar. 1, 2018.
Kameyama et al., "Compact all-fiber pulsed coherent Doppler lidar system for wind sensing," Applied Optics, vol. 46, No. 11, Apr. 10, 2007, pp. 1953-1962.
Kameyama et al., "Semianalytic pulsed coherent laser radar equation for coaxial and apertured systems using nearest Gaussian approximation," Applied Optics, vol. 49, No. 27, Sep. 20, 2010, pp. 5169-5174.
Extended European Search Report issued in corresponding European Application No. 17916881.0 dated Apr. 8, 2020.

* cited by examiner

LASER RADAR DEVICE

TECHNICAL FIELD

The present invention relates to a radar technique, and, particularly, relates to a laser radar technique of observing a state of a target such as particulate matter (e.g., aerosol) by using laser light.

BACKGROUND ART

Laser radar devices that can apply laser light into the air while setting, as a target in the air, particulate matter such as aerosol (particulates that are floating in the air and consist of liquid or solid), cloud droplets, or atmospheric molecules, receive scattered light reflected by the target, and measure information showing an atmospheric state such as a wind velocity on the basis of the scattered light received are known. A laser radar device of this type is disclosed in, for example, Patent Literature 1 (PCT International Application Publication No. WO 2016/117159).

The conventional laser radar device disclosed in Patent Literature 1 includes a beam scanning optical system that receives, as received light, scattered light reflected by the air while scanning the air with transmission light of a laser beam, an optical axis correcting unit that refracts the received light by using two wedge prisms, and compensates for the angle difference (an angular deviation of the optical axis) between the transmission light and the received light, an optical coupler that combines output light of this optical axis correcting unit and local light branched from the transmission light, and a signal processor that performs heterodyne detection on output light of this optical coupler. In this conventional laser radar device, because the optical axis correcting unit can optically compensate for the angle difference occurring between the transmission light and the received light because of the beam scanning, a signal receiving unit can perform wind velocity measurements without decreasing the received signal intensity.

CITATION LIST

Patent Literature

Patent Literature 1: PCT International Application Publication No. WO 2016/117159 (for example, FIGS. 1 and 3)

SUMMARY OF INVENTION

Technical Problem

In the above-mentioned conventional laser radar device, the optical axis correcting unit compensates for the above-mentioned angle difference by controlling the rotating states of the two wedge prisms. However, because this optical axis correcting unit consists of the two wedge prisms, an optical component that guides the received light to these wedge prisms, and a mechanism that rotates these wedge prisms mechanically, there is a problem where the responsivity is low. For example, in a case in which the distance to the target is 100 meters, because an optical propagation time that elapses until the scattered light reflected by the target is received since the transmission light has been emitted toward the target is approximately 0.66 μsec, the response time required to compensate for the angle difference is of order of several tens of nsec (nanoseconds), though the response time depends on the receiving field of view and the scanning speed. It is difficult for the above-mentioned conventional laser radar device to correctly compensate for the angle difference in such a short response time.

Further, in the above-mentioned conventional laser radar device, when the machining accuracy or the assembly accuracy of each of the following components: the two wedge prisms and the optical component is low, there is a possibility that the angle difference between the transmission light and the received light cannot be correctly compensated for. In this case, the received signal intensity in the signal receiving unit decreases, and the signal-to-noise power ratio (SNR) degrades.

In view of the foregoing, it is an object of the present invention to provide a laser radar device that, even when an angle difference occurs between transmission light and received light, can compensate for the angle difference with a high degree of responsivity and can also provide a high SNR.

Solution to Problem

In accordance with one aspect of the present invention, a radar device is provided, which includes: a light source array having a plurality of light emitting ends, configured to simultaneously emit a plurality of laser light beams, respectively, from the plurality of light emitting ends; an optical splitter configured to separate part of the plurality of laser light beams, as transmission light, from the plurality of laser light beams, and configured to separate a plurality of local light components from the plurality of laser light beams, respectively; an optical modulator configured to modulate the transmission light to generate modulated transmission light; a transmission/reception optical system configured to receive, as received light, the modulated transmission light reflected by a target existing in external space, while scanning the external space with the modulated transmission light; an optical combiner configured to generate a plurality of interference light components by combining the received light and the plurality of local light components; an optical receiver array including a plurality of optical receivers arranged at respective positions that optically correspond to different receiving fields of view of the transmission/reception optical system, and configured to generate a plurality of detection signals by detecting the plurality of interference light components; a switching circuit configured to select a detection signal from among the plurality of detection signals in accordance with a scanning speed of the transmission/reception optical system with respect to the external space; and a signal processor configured to calculate an observation quantity indicating a state of the target on a basis of the selected detection signal.

Advantageous Effects of Invention

According to the present invention, a high-SNR detection signal having high signal intensity can be selected from the plurality of detection signals corresponding to the plurality of receiving fields of view in accordance with the scanning speed of the transmission/reception optical system with respect to the external space. Therefore, even when an angle difference occurs between the modulated transmission light and the received light, the observation quantity showing a state of the target can be calculated on the basis of the selected detection signal with a high degree of accuracy. Further, because the phase difference is compensated for without having to provide a structural configuration for optically compensating for the angle difference, high responsivity can be implemented.

DESCRIPTION OF EMBODIMENTS

Hereinafter, various embodiments according to the present invention will be explained in detail with reference to drawings. It is assumed that components denoted by the same reference signs in the whole of the drawings have the same configurations and the same functions.

Embodiment 1

Figure 1:
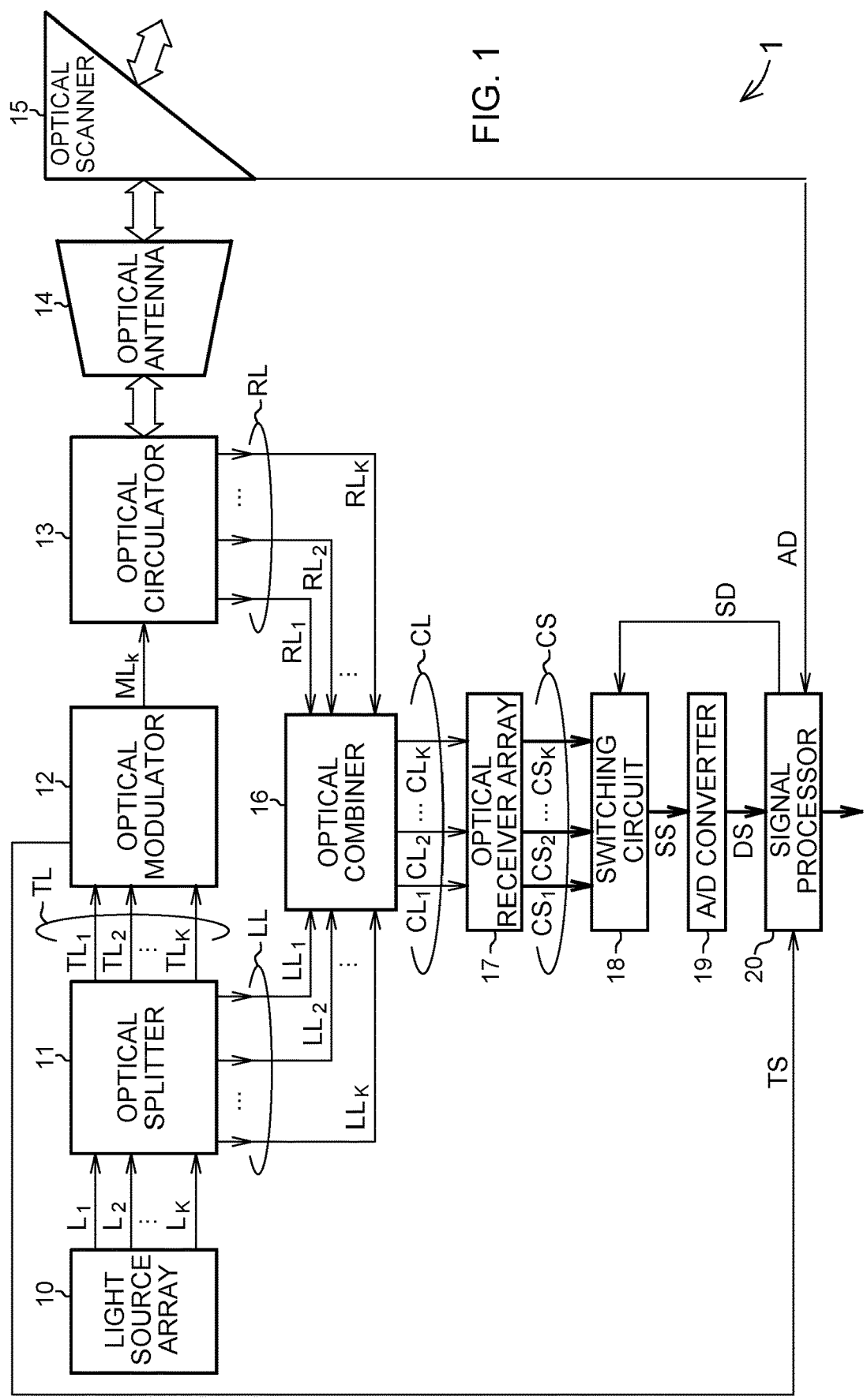
FIG. 1 is a block diagram showing the schematic configuration of a laser radar device of Embodiment 1 according to the present invention.
Figure 2:
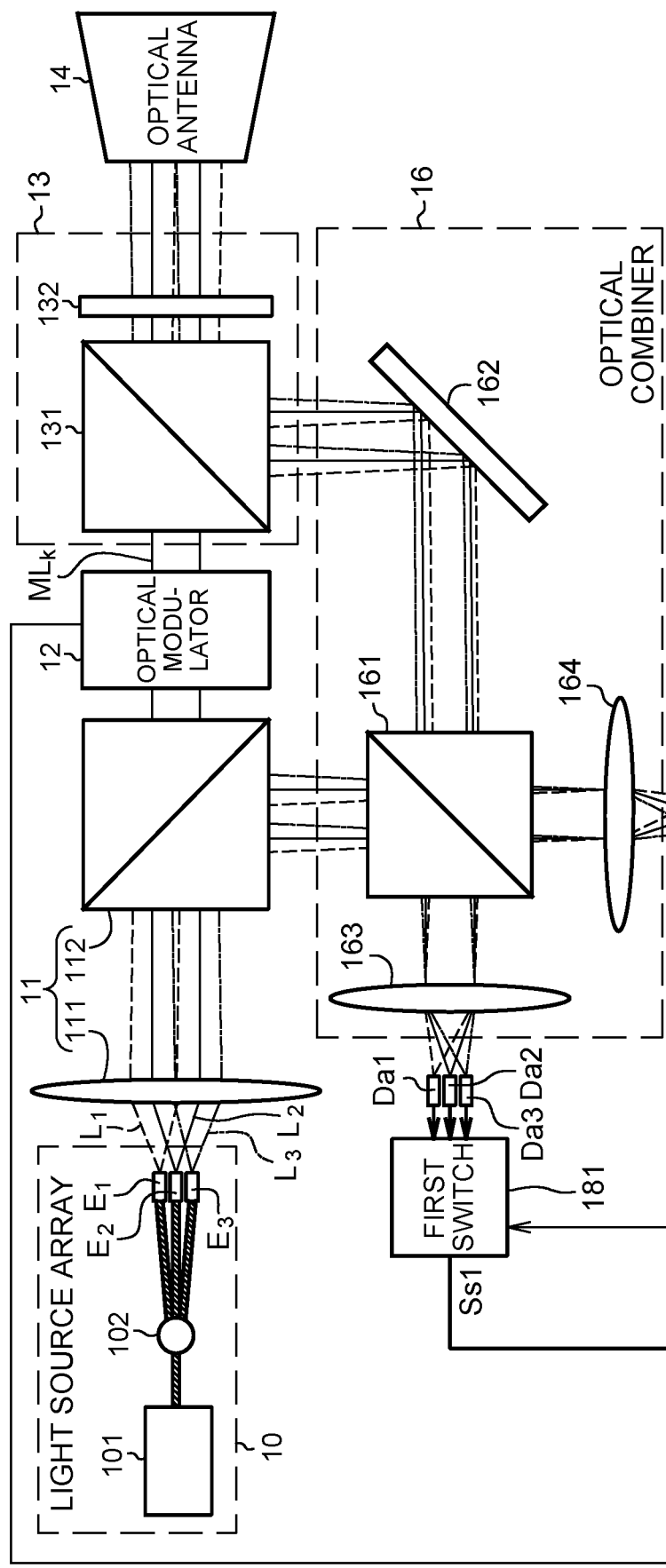
FIG. 2 is a diagram showing a concrete example of the configuration of a main part of the laser radar device of Embodiment 1.

FIG. 1 is a block diagram showing the schematic configuration of a laser radar device 1 that is Embodiment 1 according to the present invention. FIG. 2 is a diagram showing a concrete example of the configuration of a main part of the laser radar device 1. As shown in FIG. 1, the laser radar device 1 includes a light source array 10, an optical splitter 11, an optical modulator 12, an optical circulator 13, an optical antenna 14, an optical scanner 15, an optical combiner 16, an optical receiver array 17, a switching circuit 18, an analog-to-digital converter (A/D converter) 19, and a signal processor 20. A transmission/reception optical system of this embodiment is constituted by a combination of the optical circulator 13, the optical antenna 14, and the optical scanner 15.

The light source array 10 has K light emitting ends (K is an integer equal to or greater than 3) arranged in space (in two or three dimensions), and emits K laser light beams $L_1$ to $L_K$ from these K light emitting ends toward the optical splitter 11. As will be mentioned later, the optical antenna 14 has K different receiving fields of view, and can receive scattered light beams of K receiving channels $CH_1$, $CH_2$, ..., $CH_K$, respectively, byway of these K receiving fields of view. The number of laser light beams $L_1$ to $L_K$ is the same as the number of receiving channels $CH_1$ to $CH_K$. Although in this embodiment the number of receiving channels is three or more, no limitation thereto is intended, and the number of receiving channels may be two.

In the example of FIG. 2, the light source array 10 has a reference light source 101 that outputs a reference laser beam, an optical splitting element 102 that splits the single reference laser beam inputted via an optical waveguide from this reference light source 101 into three laser light beams $L_1$ to $L_3$, and light emitting ends E1 to E3 from which the three laser light beams $L_1$ to $L_3$ inputted from this optical splitting element 102 are respectively outputted toward the optical splitter 11. As the reference light source 101, a semiconductor laser or a solid-state laser should just be used. The polarization state of the reference laser beam is held in such a way as to be a linear one in which the reference laser beam is polarized in one direction. As the optical splitting element 102, for example, an optical fiber branching coupler of melting type or a branching coupler of filter type (an optical component that branches light by using a dielectric multilayer film filter) should just be used. As the light source array 10, an array laser having a plurality of light emitting surfaces may be used.

Referring to FIG. 1, the optical splitter 11 separates transmission light components $TL_1$ to $TL_K$ from the inputted laser light beams $L_1$ to $L_K$, respectively, and separates local light components $LL_1$ to $LL_K$ from the laser light beams $L_1$ to $L_K$, respectively. The optical splitter 11 outputs transmission light TL including the transmission light components $TL_1$ to $TL_K$ to the optical modulator 12, and outputs local light LL including the local light components $LL_1$ to $LL_K$ to the optical combiner 16. As the optical splitter 11, for example, either a branching mirror having a multilayered dielectric film-filter or a beam splitter should just be used.

In the example of FIG. 2, the optical splitter 11 includes a light guide optical system 111 and a beam splitter 112. The light guide optical system 111 is an optical component that guides the laser light beams $L_1$ to $L_3$ inputted from the light source array 10 to a light incidence surface of the beam splitter 112. The beam splitter 112 allows parts of the laser light beams $L_1$ to $L_3$ inputted from the light guide optical system 111 to pass therethrough as transmission light components $TL_1$ to $TL_3$, and reflects local light components $LL_1$ to $LL_3$ that are separated from the laser light beams $L_1$ to $L_K$ at a predetermined branching ratio toward the optical combiner 16. The predetermined branching ratio should just be determined by a system design.

Referring to FIG. 1, the optical modulator 12 performs frequency modulation and intensity modulation only on a transmission light component $TL_k$ out of the transmission light components $TL_1$ to $TL_K$ inputted from the optical splitter 11, thereby shifting the frequency of the transmission light component $TL_k$ and pulsing the transmission light component $TL_k$. The optical modulator 12 generates modulated transmission light $ML_k$ (a series of pulse light beams)

having a predetermined pulse width T at a predetermined pulse repetitive frequency (PRF) by performing the frequency modulation and the intensity modulation, and outputs the modulated transmission light $ML_k$ to the optical circulator 13. The optical modulator 12 also outputs a pulse trigger signal TS generated for pulsing the transmission light component $TL_k$ to the signal processor 20. The pulse trigger signal TS shows a timing at which to pulse the transmission light component $TL_k$.

Here, the pulse width T corresponds to a distance resolution value. It is possible to set up the pulse width T corresponding to a desired distance resolution value in advance. Further, in the optical modulator 12, a fixed pulse width T and a fixed PRF that are set up at the time of designing may be used. In addition, when the intensity of the output light of the optical modulator 12 is insufficient, an optical amplifier that amplifies the output light of the optical modulator 12 may be disposed as a stage following the optical modulator 12. The optical modulator 12 may shift the frequency of the transmission light by using a phase modulator having a frequency shift function.

As the optical modulator 12 as above, for example, an acousto-optical (AO) frequency shifter or a well-known optical phase modulator should just be used. As the pulse trigger signal TS, for example, a transistor-transistor logic (TTL) signal having a TTL level of 5 volts can be used.

The optical circulator 13 is an optical device of nonreciprocal type having three ports. More specifically, the optical circulator 13 has an optical input port on which light is incident from the optical modulator 12, an optical input/output port on which light is incident from the optical antenna 14 and from which light is emitted to the optical antenna 14, and an optical output port from which light is emitted to the optical combiner 16. The optical circulator 13 optically separates the modulated transmission light $ML_k$ inputted from the optical modulator 12 to the optical input port, and light inputted from the optical antenna 14 to the optical input/output port from each other. The optical circulator 13 then outputs the modulated transmission light $ML_k$ inputted from the optical modulator 12 from the optical input/output port to the optical antenna 14, and simultaneously outputs the light inputted from the optical antenna 14 from the optical output port to the optical combiner 16.

The optical antenna 14 converts the modulated transmission light $ML_k$ inputted from the optical circulator 13 into collimated light, and outputs the collimated light to the optical scanner 15. The optical scanner 15 has a function of changing a direction (i.e., a line-of-sight direction) of applying the modulated transmission light $ML_k$ inputted from the optical antenna 14 to external space. Further, the optical scanner 15 can repeatedly scan a predetermined range of the external space with the modulated transmission light $ML_k$ inputted from the optical antenna 14. The optical scanner 15 as above should just be constituted by, for example, a wedge prism, a galvanomirror, a polygon mirror, or a combination of these optical components.

Figure 3:
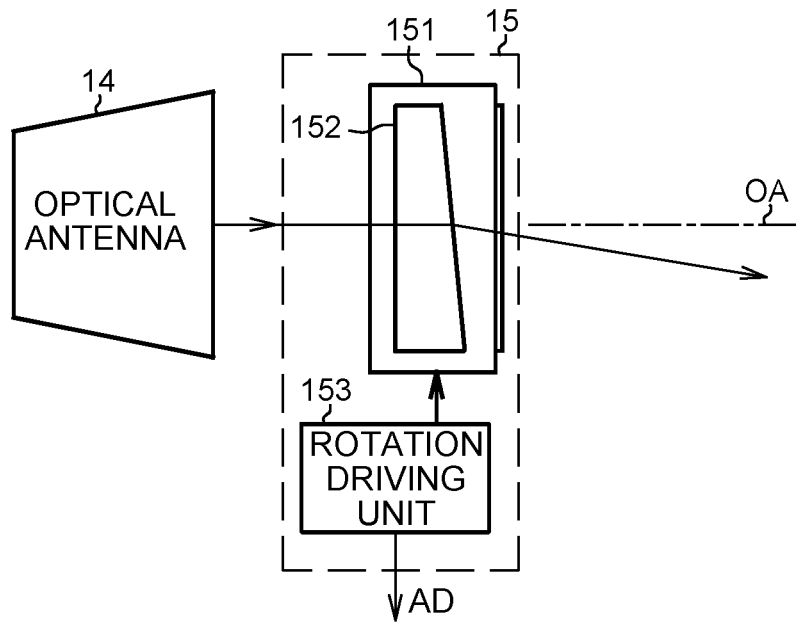
FIG. 3 is a diagram schematically showing an example of the configuration of an optical scanner of the laser radar device of Embodiment 1.

FIG. 3 is a diagram schematically showing an example of the configuration of the optical scanner 15 of Embodiment 1. As shown in FIG. 3, the optical scanner 15 has a rotor 151 including a wedge prism 152, and a rotation driving unit 153 that drives the rotation of this rotor 151 around an optical axis OA at an arbitrary speed. The rotation driving unit 153 includes a rotary motor such as a stepping motor, and a rotary encoder (which are not illustrated). An optical surface of the wedge prism 152 on a side of the optical antenna 14 is perpendicular to the optical axis OA, and an optical surface of the wedge prism 152 on a side of the external space is inclined against the optical axis OA. Therefore, the rotation driving unit 153 can scan the external space with the laser beam by rotating the wedge prism 152 around the optical axis OA. The rotation driving unit 153 outputs angle information AD detected by the rotary encoder included therein and showing a current value of the scanning angle of the optical scanner 15 to the signal processor 20.

The scanning speed of the optical scanner 15 may have a value set up in advance at the time of designing. Further, although a control signal for controlling the rotation of the rotor 151 is generated by the rotation driving unit 153 in this embodiment, no limitation thereto is intended. Instead, the configuration of the signal processor 20 may be changed in such a way that the signal processor generates a control signal for controlling the rotation of the rotor 151.

The optical antenna 14 receives, via the optical scanner 15, scattered light that has been reflected by a target in the external space, such as aerosol (particulates that are floating in the air and consist of liquid or solid), cloud droplets, or atmospheric molecules, and has returned, or scattered light (diffused light) that has been reflected by a hard target, such as a structure or a geographical object, and has returned. The optical circulator 13 shown in FIG. 1 outputs the scattered light inputted from the optical antenna 14, i.e., received light RL to the optical combiner 16. The optical antenna 14 as above can be constituted using, for example, an optical telescope or a camera lens. The optical antenna 14 may have a condensing and adjusting function.

In the example of FIG. 2, the optical circulator 13 is constituted as an optical device of space propagation type having a polarization beam splitter 131 and a wavelength plate 132. In this example, the wavelength plate 132 is a ¼ one that converts linearly polarized light inputted, via the polarization beam splitter 131, from the optical modulator 12 into circularly polarized light, and converts circularly polarized light inputted from the optical antenna 14 into linearly polarized light (horizontally polarized light). The polarization beam splitter 131 allows the linearly polarized light inputted from the optical modulator 12 to pass therethrough, and reflects the circularly polarized light inputted from the optical antenna 14 toward the optical combiner 16.

Figure 4:
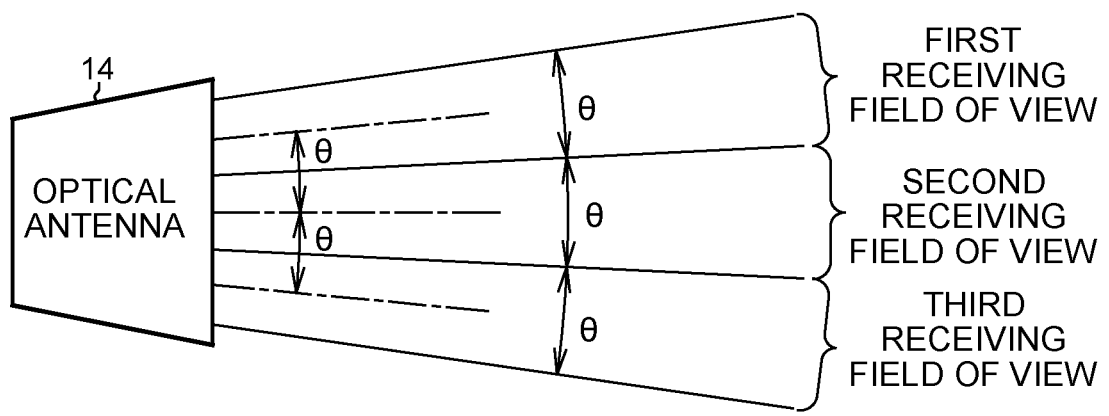
FIG. 4 is a diagram showing an example of a plurality of receiving fields of view of an optical antenna in Embodiment 1.

The optical antenna 14 shown in FIG. 1 has K different receiving fields of view for the scattered light coming from the target. The optical circulator 13 outputs the received light RL including received light components $RL_1, RL_2, \ldots,$ and $RL_K$ of the K receiving channels $CH_1, CH_2, \ldots,$ and $CH_K$, the received light components being inputted by way of these receiving fields of view, to the optical combiner 16. FIG. 4 is a diagram showing an example of three receiving fields of view (first through third receiving fields of view) of the optical antenna 14. In the example of FIG. 4, a receiving field-of-view angle θ per each receiving channel is set up in such a way as to be equal to the divergence θ of the transmission laser beam (the laser beam of the modulated transmission light $ML_k$). Further, these receiving fields of view are set up in such a way that angular directions that are different from each other by an angular offset of θ can be observed. However, instead of this example, the angular offset may be set to a value (e.g., θ/2) in such a way that adjacent receiving fields of view overlap each other.

Next, referring to FIG. 1, the optical combiner 16 combines the local light LL inputted from the optical splitter 11 and the received light RL inputted from the optical circulator 13, to generate interference light CL including K interference light components $CL_1, \ldots,$ and $CL_K$, and outputs this interference light CL, i.e., an optical beat signal to the optical receiver array 17. The optical combiner 16 can be constituted using, for example, either a branching mirror having a dielectric multilayer film filter or a beam splitter.

The optical receiver array 17 has K optical receivers arranged at respective positions that optically correspond to the K receiving fields of view of the optical antenna 14. These K optical receivers can generate an analog detection signal group CS including K analog detection signals $CS_1$, $CS_2$, ..., and $CS_K$ by performing heterodyne detection (frequency demodulation) on each of the K interference light components $CL_1$, $CL_2$, ..., and $CL_K$. The k-th interference light component $CL_k$ is caused by the combining of the k-th local light component $LL_k$ and the k-th received light component $RL_k$.

The optical combiner 16 and the optical receiver array 17 may be configured in such a way as to be able to perform balanced detection. The balanced detection makes it possible to reduce phase noise after heterodyne detection.

The switching circuit 18 can select an analog detection signal SS from the analog detection signals $CS_1$, $CS_2$, ..., and $CS_K$ in accordance with the scanning speed of the optical scanner 15, and can output the selected analog detection signal SS to the A/D converter 19.

As will be mentioned later, the signal processor 20 successively calculates speed information SD showing the scanning speed of the optical scanner 15 on the basis of the angle information AD, and provides this speed information SD to the switching circuit 18. The switching circuit 18 calculates an angular deviation $\theta_d$ corresponding to a delay time τ from the time of transmission of the laser beam to the time of reception of the scattered light on the basis of the scanning speed. Here, the angular deviation $\theta_d$ is the angle difference between the direction of transmission of the laser beam (the laser beam of the modulated transmission light $ML_k$), and the direction of arrival of the scattered light at the optical antenna 14.

Then, the switching circuit 18 selects the receiving channel $CH_p$ corresponding to the direction of arrival of the scattered light on the basis of the value of the angular deviation $\theta_d$, and selects the analog detection signal SS corresponding to the receiving channel $CH_p$ from the analog detection signals $CS_1$, $CS_2$, ..., and $CS_K$. As a result, the switching circuit 18 can select the output signal (analog detection signal) SS of the optical receiver optically corresponding to the receiving field of view showing the direction of arrival of the scattered light.

Assuming that all of the analog detection signals $CS_1$, $CS_2$, ..., and CSK are added, the SNR of the added signals degrades because the analog detection signal of a receiving channel (receiving field of view) via which no scattered light has arrived is also added. In contrast with this, because the switching circuit 18 of this embodiment selects the analog detection signal SS of the receiving channel (receiving field of view) via which the scattered light has arrived, the degradation in the SNR resulting from the angular deviation $\theta_d$ can be avoided.

When the beam scanning by the optical scanner 15 is performed in a certain direction at the predetermined scanning speed $V_{scan}$ (unit: radian/second), the angular deviation $\theta_d$ corresponding to the delay time τ (unit: second) from the time of transmission of the laser beam to the time of reception of the scattered light is given by $\tau \times V_{scan}$ (unit: radian). Therefore, on the basis of the angular deviation $\theta_d$, the switching circuit 18 can predetermine which receiving channel is to be selected for the delay time τ. For example, the switching circuit 18 can determine the timing at which to switch among the receiving channels with an integer value when rounding up the decimal point of $t_{ch}=(\theta_d/\theta)$.

Here, θ is the receiving field-of-view angle per each receiving channel. At this time, although the number of receiving channels to be selected may be only one, no limitation thereto is intended. In order to allow overlapping, two or more receiving channels may be selected. In this case, the switching circuit 18 should just add the analog detection signals of the two or more selected receiving channels, and output the added signals to the A/D converter 19. As a result, a high-SNR signal can be generated while a large receiving field of view is ensured.

In the example of FIG. 2, the optical combiner 16 includes a beam splitter 161, a reflecting mirror 162, and condensing optical systems 163 and 164. Further, the optical receiver array 17 of FIG. 1 includes optical receivers Da1 to Da3 and optical receivers Db1 to Db3. The sum of output signals of the optical receivers Da1 and Db1 corresponds to the analog detection signal $CL_1$, the sum of output signals of the optical receivers Da2 and Db2 corresponds to the analog detection signal $CL_2$, and the sum of output signals of the optical receivers Da3 and Db3 corresponds to the analog detection signal $CL_3$. In addition, the switching circuit 18 of FIG. 1 includes a first switch 181, a second switch 182, an adder 183, and a channel selecting circuit 184.

As shown in FIG. 2, the reflecting mirror 162 reflects the received light RL inputted from the polarization beam splitter 131 toward the beam splitter 161. The beam splitter 161 allows part of the received light RL incident thereon, via the reflecting mirror 162, from the polarization beam splitter 131 to pass therethrough toward the condensing optical system 163, and reflects the remainder of the received light RL toward the other condensing optical system 164. Simultaneously, the beam splitter 161 reflects part of the local light LL incident thereon from the optical splitter 11 toward the condensing optical system 163, and allows the remainder of the local light LL to pass therethrough toward the other condensing optical system 164. As a result, the beam splitter 161 outputs interference light generated by combining of the part of the received light RL and the part of the local light LL to the condensing optical system 163, and simultaneously outputs interference light generated by combining of the remainder of the received light RL and the remainder of the local light LL to the other condensing optical system 164.

As shown in FIG. 2, the condensing optical system 163 condenses the interference light incident from the beam splitter 161 onto the optical receivers Da1 to Da3, and the condensing optical system 164 condenses the interference light incident from the beam splitter 161 onto the optical receivers Db1 to Db3.

The optical receivers Da1, Da2, and Da3 are arranged at respective positions that optically correspond to the first, second, and third receiving fields of view of FIG. 4. Therefore, the optical receivers Da1, Da2, and Da3 can respectively detect three interference light components including three scattered light components respectively propagating from the first, second, and third receiving fields of view, and output three analog detection signals. On the other hand, the optical receivers Db1, Db2, and Db3 are also arranged at respective positions that optically correspond to the first, second, and third receiving fields of view of FIG. 4. Therefore, the optical receivers Db1, Db2, and Db3 can respectively detect three interference light components including three scattered light components respectively propagating from the first, second, and third receiving fields of view, and output three analog detection signals.

The channel selecting circuit 184 calculates the angular deviation $\theta_d$ corresponding to the delay time T from the time of transmission of the laser beam to the time of reception of the scattered light on the basis of the speed information SD successively provided from the signal processor 20, and selects the receiving channel $CH_p$ corresponding to the direction of arrival of the scattered light on the basis of the calculated angular deviation θd. Next, the channel selecting circuit 184 provides a selection control signal CS for causing an output showing the analog detection signal $CS_p$ of the receiving channel $CH_p$ to be selected to both the first switch 181 and the second switch 182. The first switch 181 and the second switch 182 select the outputs Ss1 and Ss2 specified by the selection control signal CS from the outputs of the optical receivers Da1 to Da3 and Db1 to Db3, and provide the selected outputs Ss1 and Ss2 to the adder 183. The adder 183 adds the provided outputs Ss1 and Ss2 to generate an analog detection signal SS ($=CS_p$), and outputs the analog detection signal SS to the A/D converter 19.

The A/D converter 19 generates a digital detection signal DS by sampling the analog detection signal SS at a sampling frequency fs, and outputs this digital detection signal DS to the signal processor 20. As the A/D converter 19, for example, a double integral type A/D converter, a successive approximation type A/D converter, or a parallel comparison type A/D converter can be used. The A/D converter 19 may generate a digital detection signal DS by using the pulse trigger signal TS as a trigger and sampling the analog detection signal SS in synchronization with the pulse trigger signal TS.

The signal processor 20 shown in FIG. 1 has a function of calculating observation quantities showing the state of a target on the basis of the digital detection signal DS. Although the signal processor 20 can be configured so as to calculate a line-of-sight velocity and a velocity vector of a target such as particulate matter floating in the air (e.g., aerosol, cloud droplets, or atmospheric molecules) as observation quantities showing the state of the target, as will be mentioned later, the calculated observation quantities are not limited to the line-of-sight velocity and the velocity vector. For example, the signal processor 20 may be configured so as to be able to measure the time required for light to propagate between the laser radar device 1 and a target on the basis of the digital detection signal DS, and calculate the distance (distance measurement value) to the target on the basis of the measured value of the light propagation time. The laser radar device 1 may be configured in such a way that the optical scanner 15 scans a surface of a target with the modulated transmission light $ML_k$, and the signal processor 20 measures a distribution of the distance to the target. As a result, it becomes possible to measure the three-dimensional shape of a target such as a moving object (e.g., a vehicle, a human body, or an animal), a geographical object, or a structure.

Figure 5:
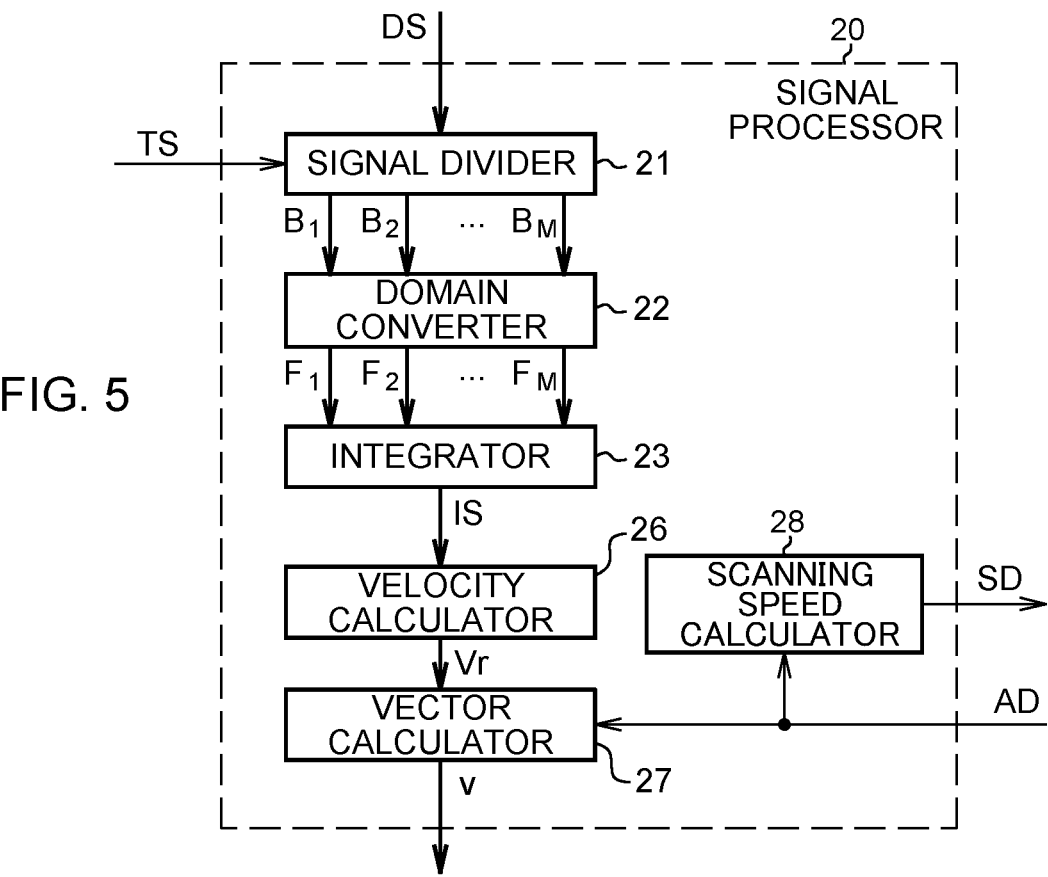
FIG. 5 is a diagram schematically showing the configuration of a signal processor in the laser radar device of Embodiment 1.

FIG. 5 is a block diagram schematically showing an example of the configuration of the signal processor 20 in this embodiment. The signal processor 20 shown in FIG. 5 can calculate a signal spectrum (an amplitude spectrum or a power spectrum) of the digital detection signal DS, and calculate a line-of-sight velocity and a velocity vector showing the moving state of a target on the basis of the signal spectrum. As shown in FIG. 5, the signal processor 20 includes a signal divider 21 that divides the digital detection signal DS into M range bin signals (time domain signals) $B_1$, $B_2$, . . . , and $B_M$ respectively showing the signal waveforms of M continuous gate time domains (M is a positive integer equal to or greater than 3), a domain converter 22 that converts these range bin signals $B_1$, $B_2$, . . . , and $B_M$, respectively, into frequency domain signals $F_1$, $F_2$, . . . , and $F_M$, an integrator 23 that calculates an integration spectrum IS as the signal spectrum of the digital detection signal DS on the basis of the frequency domain signals $F_1, F_2, \ldots,$ and $F_M$, a velocity calculator 26 that calculates the line-of-sight velocity Vr of the target on the basis of the integration spectrum IS, a vector calculator 27 that calculates the velocity vector v of the target, and a scanning speed calculator 28 that calculates the speed information SD showing the scanning speed of the optical scanner 15 on the basis of the angle information AD successively provided from the optical scanner 15. An observation quantity calculator of this embodiment is constituted by the velocity calculator 26 and the vector calculator 27.

The hardware configuration of the signal processor 20 as above should just be implemented by, for example, a processor having a semiconductor integrated circuit such as a digital signal processor (DSP), an application specific integrated circuit (ASIC), or a field-programmable gate array (FPGA). As an alternative, the hardware configuration of the signal processor 20 may be implemented by a processor that executes a program code of software or firmware read from a memory and that includes an arithmetic device such as a central processing unit (CPU) or a graphics processing unit (GPU).

Figure 6:
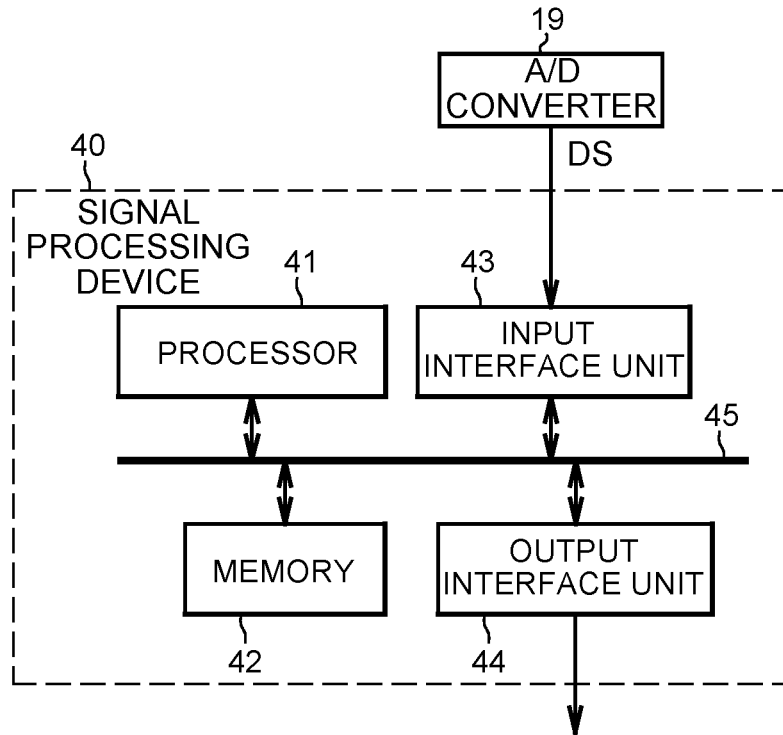
FIG. 6 is a block diagram showing an example of the hardware configuration of the signal processor in Embodiment 1.

FIG. 6 is a block diagram schematically showing a signal processing device 40 that is an example of the hardware configuration implementing the functions of the signal processor 20. The signal processing device 40 includes a processor 41, a memory 42, an input interface unit 43, an output interface unit 44, and a signal path 45. The signal path 45 is a bus for mutually connecting the processor 41, the memory 42, the input interface unit 43, and the output interface unit 44. The input interface unit 43 has a function of transmitting the digital detection signal DS and the angle information AD (not illustrated), which are inputted from the outside, to the processor 41 via the signal path 45. The processor 41 performs digital signal processing on the transmitted digital detection signal DS, to calculate the velocity vector v of the target, and calculates the speed information SD on the basis of the transmitted angle information AD. The processor 41 can output data showing the velocity vector v to external equipment (e.g., a display device) via the signal path 45 and the output interface unit 44. The processor 41 can also output the speed information SD to the switching circuit 18 via the signal path 45 and the output interface unit 44.

The memory 42 is a data storage area used when the processor 41 performs the digital signal processing. In a case in which the processor 41 includes an arithmetic device such as a CPU, the memory 42 should just have a data storage area that stores a program code of software or firmware to be executed by the processor 41. As the memory 42, for example, a semiconductor memory such as a read only memory (ROM) and a synchronous dynamic random access memory (SDRAM) can be used.

Hereafter, the configuration and operation of the signal processor 20 shown in FIG. 5 will be explained in detail.

The scanning speed calculator 28 successively calculates the speed information SD showing the scanning speed of the optical scanner 15 on the basis of the angle information AD successively provided from the optical scanner 15, and provides this speed information SD to the switching circuit 18.

Figure 7:
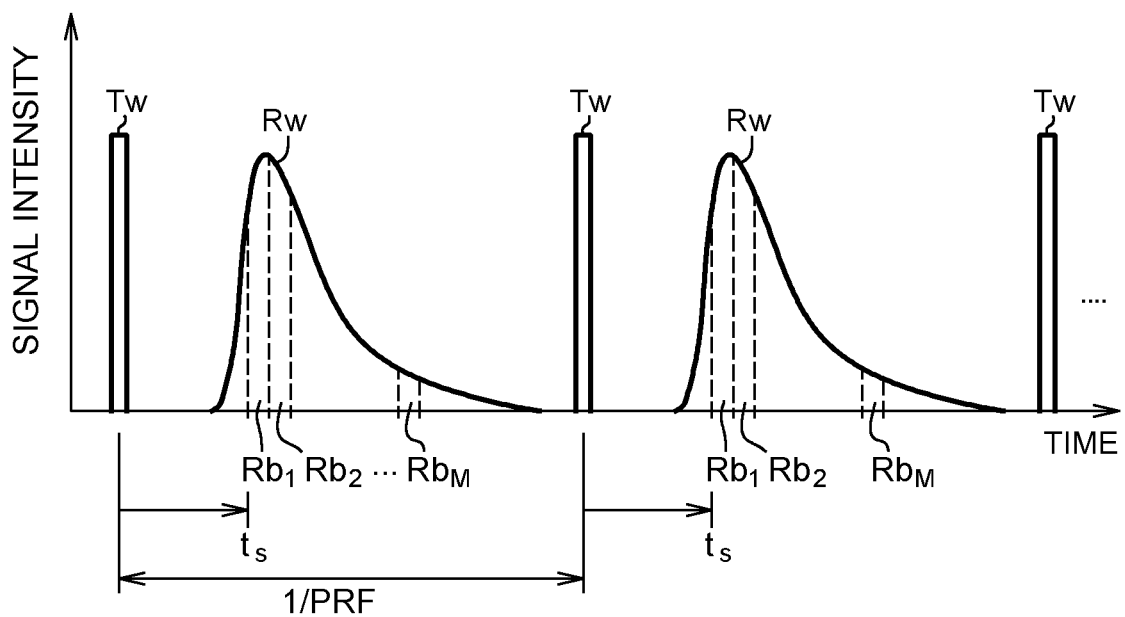
FIG. 7 is a graph schematically showing an example of a signal intensity distribution of modulated transmission light and received light.

The signal divider 21 receives the digital detection signal DS selected by the switching circuit 18 and divides the digital detection signal DS into M range bin signals (time domain signals) $B_1, B_2, \ldots,$ and $B_M$ respectively showing the signal waveforms of M continuous gate time domains. FIG. 7 is a graph for explaining a concept of range bins. In this graph, the horizontal axis shows a time, and the vertical axis shows signal intensity. As shown in FIG. 7, a transmission pulse Tw showing the modulated transmission light $ML_k$ is repeatedly transmitted at a period of 1/PRF. A reception signal Rw of the scattered light reflected by the target is observed for each transmission (shot) of the transmission pulse Tw. A time $t_s$ is a measurement start time of each transmission (shot) of the transmission pulse Tw. The reception signal Rw is divided into range bins $Rb_1$, $Rb_2$, ..., and $Rb_M$ on the M gate time domains. The range bin signals $B_1$, $B_2$, ..., and $B_M$ correspond to these range bins $Rb_1$, $Rb_2$, ..., and $Rb_M$, respectively.

For example, as to the distance resolution $R_{res}$ that is set to approximately 30 meters, a gate time period (time width) that defines each range bin can be set to $2R_{res}/c$ (c: the velocity of light). Further, it is assumed that as a value for adjusting an observation start distance, a distance value corresponding to a delay time that elapses until the A/D converter 19 starts A/D conversion in response to the pulse trigger signal TS is denoted by $R_{min}$. At this time, in a case in which the delay time required to start the A/D conversion with respect to the pulse trigger signal TS is 0, and measurements are started from, for example, 40 meters, a value of 40 can be set up as the distance value $R_{min}$, and the measurement start time for the time waveform of each digital detection signal can be set to $t_{start}=2R_{min}/c$.

Figure 8:
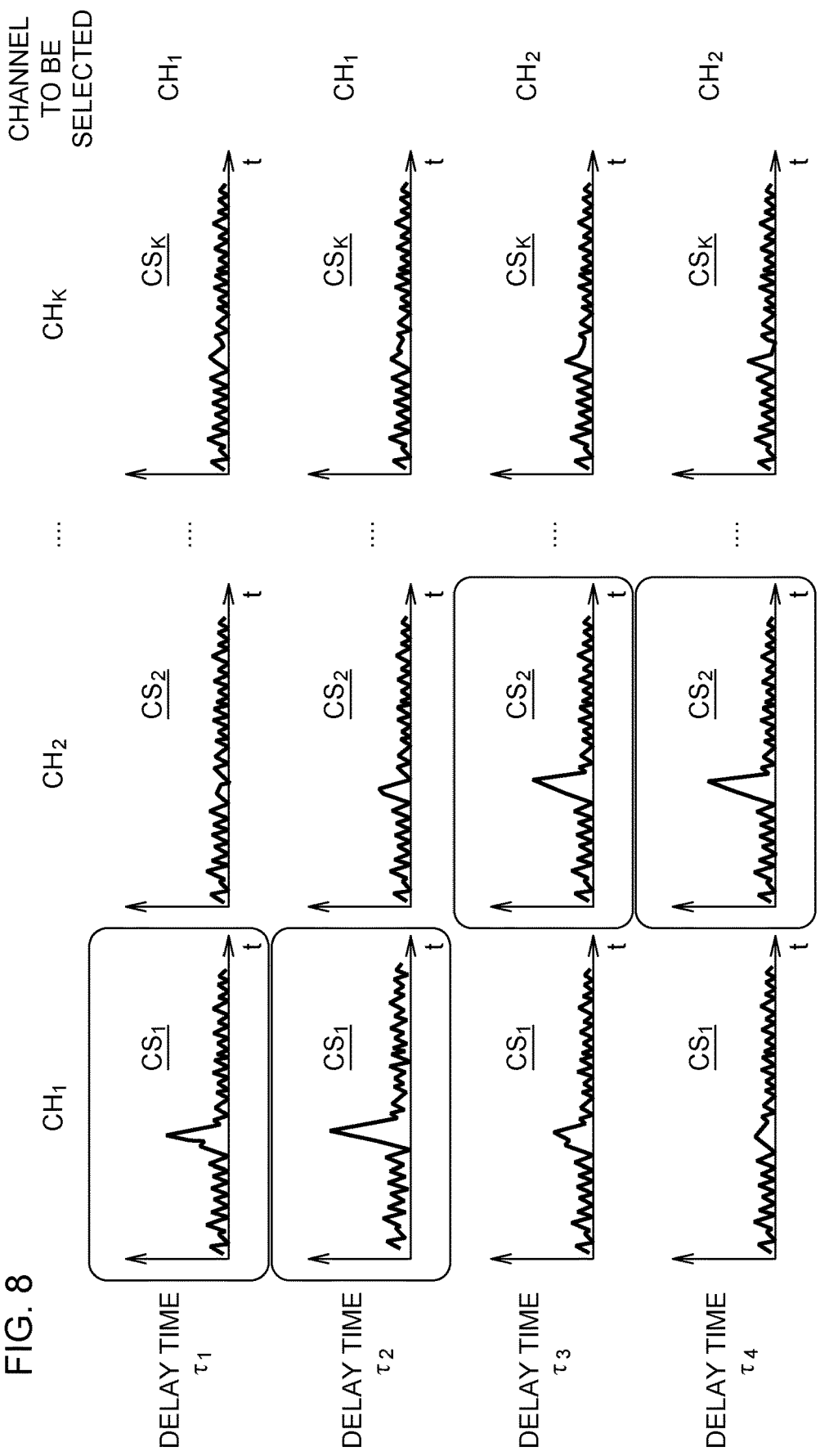
FIG. 8 is a diagram for explaining an example of a method of selecting a receiving channel according to Embodiment 1.

In the switching circuit 18, the analog detection signals $CS_1$, $CS_2$, ..., and $CS_K$ of the receiving channels $CH_1$, $CH_2$, ..., and $CH_K$ are inputted, as illustrated in FIG. 8. When the delay time τ from the time of transmission of the laser beam to the time of reception of the scattered light is $τ_1$ or $τ_2$, the switching circuit 18 selects the receiving channel $CH_1$ in order to compensate for the angular deviation corresponding to the delay time $τ_1$ or $τ_2$, and selects the analog detection signal $CS_1$ of this receiving channel $CH_1$ as the analog detection signal SS. In contrast, when the delay time τ is $τ_3$ or $τ_4$, the switching circuit 18 selects the receiving channel $CH_2$ in order to compensate for the angular deviation corresponding to the delay time $τ_3$ or $τ_4$, and selects the analog detection signal $CS_2$ of the receiving channel $CH_2$ as the analog detection signal SS. When the analog detection signal SS selected by the switching circuit 18 in this way is inputted, the signal divider 21 divides the analog detection signal SS into M range bin signals $B_1$, $B_2$, ..., and $B_M$.

The domain converter 22 shown in FIG. 5 converts the range bin signals $B_1$, $B_2$, ..., and $B_M$ acquired for each shot, respectively, into frequency domain signals $F_1$, $F_2$, ..., and $F_M$. Concretely, the domain converter 22 can calculate frequency domain signals $F_1$, $F_2$, ..., and $F_M$ by performing a discrete Fourier transform on each of the range bin signals $B_1$, $B_2$, ..., and $B_M$. As the discrete Fourier transform, a fast Fourier transform (FFT) with FFT bins whose number is $N_{FFT}$ (e.g., 256) can be used.

The integrator 23 calculates, as to each shot, a spectrum S (m, n) of each of the range bin signals $B_1$, $B_2$, ..., and $B_M$ on the basis of the frequency domain signals $F_1$, $F_2$, ..., and $F_M$. Here, m is a positive integer (m=1 to M) showing a range bin number, and n is a positive integer (n=1 to N) showing a shot number. N is the number of integrations that is specified by a user in advance. The spectrum S (m, n) should just be an amplitude spectrum showing a relation between frequencies and signal amplitudes, or a power spectrum showing a relation between frequencies and pieces of power.

Figure 9:
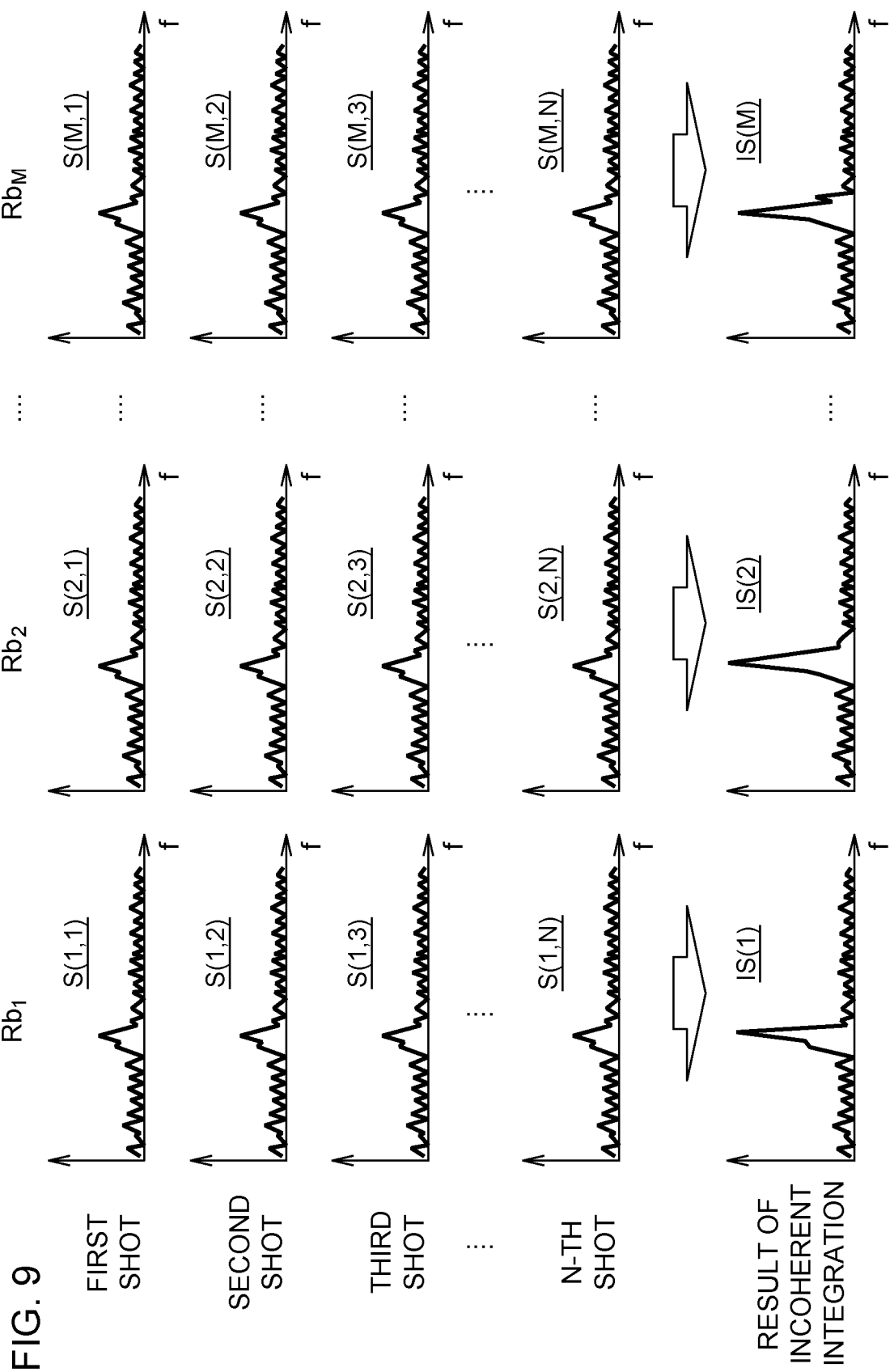
FIG. 9 is a diagram for explaining an integrating process according to Embodiment 1.

Further, the integrator 23 integrates, as to each range bin (range bin number m), the spectra S(m, 1) to S(m, N) in a direction of the shot number (performs incoherent integration) to calculate an integration signal spectrum IS(m) with a high SNR. FIG. 9 is a diagram showing an overview of the integrating process in the integrator 23. For example, as to the range bin $Rb_1$, the integrator 23 can calculate an integration signal spectrum IS(1) with a high SNR by integrating the spectra S(1, 1) to S(1, N). When the result of this integration is averaged with the number N of integrations, the SNR is improved by a factor of $N^{1/2}$ for the number N of integrations. Although the incoherent integration is used in the integrator 23, coherent integration may be used instead of the incoherent integration.

In addition, the integrator 23 calculates an integration spectrum IS by integrating the integration signal spectra IS(1) to IS(M), and outputs this integration spectrum IS to the velocity calculator 26.

The velocity calculator 26 detects the frequency at the peak position or the centroid position of the integration spectrum IS as a Doppler frequency $f_d$. The velocity calculator 26 then calculates the velocity component of the target in the line-of-sight direction corresponding to the angle information AD, i.e., the line-of-sight velocity Vr (unit: m/s) by using the Doppler frequency $f_d$. The line-of-sight velocity Vr can be calculated in accordance with the following equation (1). Here, λ is the wavelength of the laser beam.

$$Vr=\lambda \times f_d/2 \qquad (1)$$

The vector calculator 27 can calculate the velocity vector of the target on the basis of the line-of-sight velocity Vr, by using a well-known vector combining method or a velocity azimuth display (VAD) method. In a case of using a vector combining method, for example, the line-of-sight velocity Vr is expressed by the following equation (2), using a horizontal wind velocity (U) in an east-west direction, a horizontal wind velocity (V) in a north-south direction, a wind velocity (W) in a vertical direction, an elevation angle (θ), and an azimuth angle (φ) with respect to north.

$$Vr=U \sin φ \sin θ+V \cos φ \sin θ+W \cos θ \qquad (2)$$

The vector calculator 27 can calculate the velocity vector v=(U, V, W) of the target as a wind velocity vector by, for example, solving simultaneous equations on the basis of at least three line-of-sight velocities in three line-of-sight directions.

Advantages of the laser radar device 1 of Embodiment 1 explained above are as follows. The optical receiver array 17 has the K optical receivers arranged at the respective positions that optically correspond to the K receiving fields of view of the optical antenna 14, and these optical receivers generate analog detection signals $CS_1$ to $CS_K$ by respectively detecting K interference light components. The switching circuit 18 can select a high-SNR analog detection signal SS having high signal intensity from the analog detection signals $CS_1$ to $CS_K$ respectively corresponding to the K receiving fields of view in accordance with the scanning speed of the optical scanner 15. Therefore, even though an angle difference (angular deviation) resulting from a delay time occurs between the transmission direction of the modulated transmission light $ML_k$ and the direction of arrival of scattered light at the optical antenna 14, the signal processor 20 can calculate an observation quantity showing a state of a target on the basis of a digital detection signal DS acquired from the high-SNR analog detection signal SS with a high degree of accuracy.

Further, the laser radar device 1 of this embodiment can compensate for the angular deviation in a short response time without having to provide a structural configuration of compensating for the angle difference as disclosed in Patent Literature 1. Therefore, because the digital detection signal DS with a high SNR can be acquired even though the distance to the target is short, the observation quantity can be calculated with a high degree of accuracy.

Embodiment 2

Figure 10:
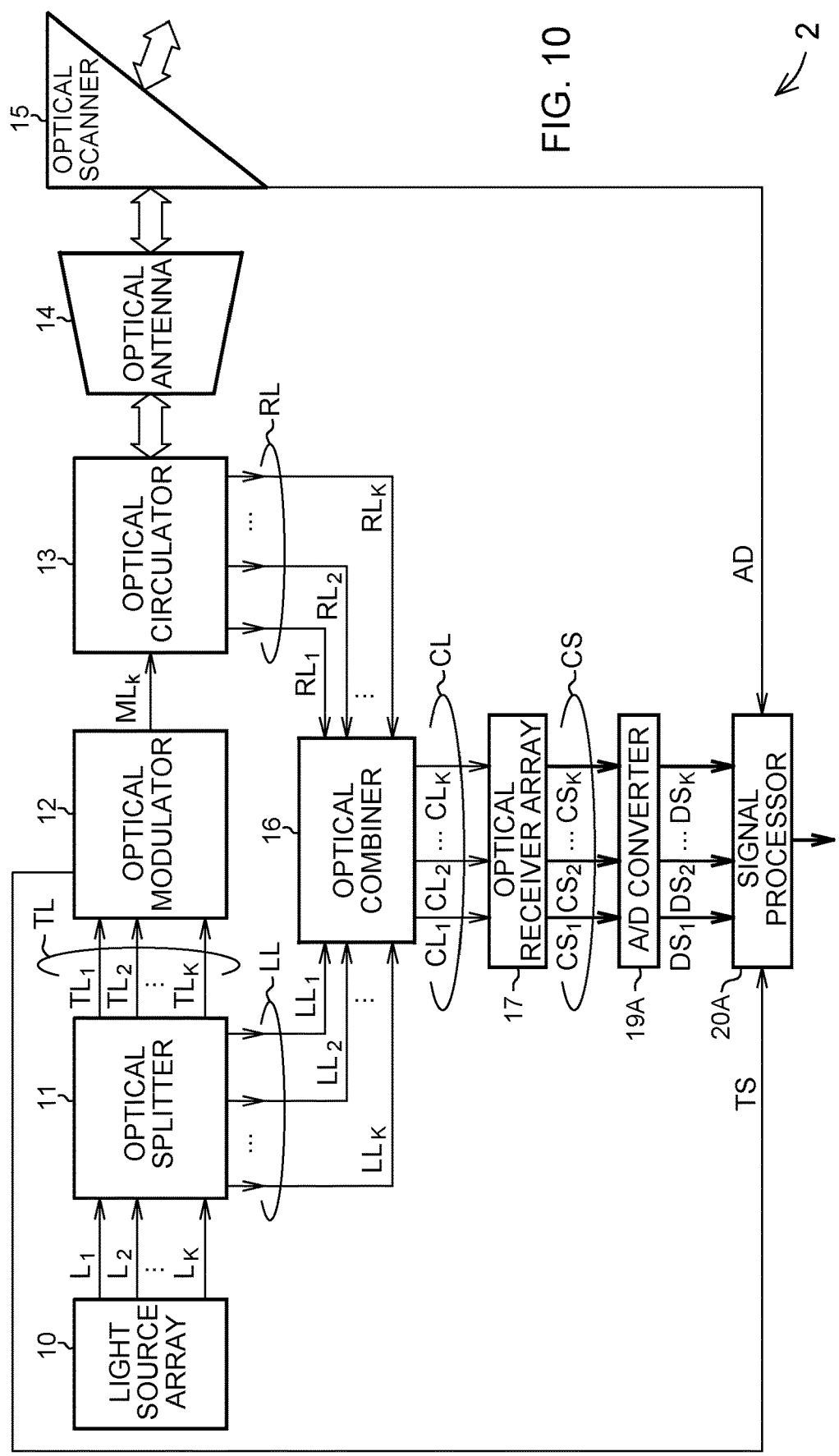
FIG. 10 is a block diagram showing the schematic configuration of a laser radar device of Embodiment 2 according to the present invention.

FIG. 10 is a block diagram showing the schematic configuration of a laser radar device 2 that is Embodiment 2 according to the present invention. As shown in FIG. 10, the laser radar device 2 includes a light source array 10, an optical splitter 11, an optical modulator 12, an optical circulator 13, an optical antenna 14, an optical scanner 15, an optical combiner 16, and an optical receiver array 17, like that of the above-mentioned Embodiment 1. The configuration of the laser radar device 2 of this embodiment is the same as that of the laser radar device 1 of Embodiment 1, with the exception that, instead of the switching circuit 18, the A/D converter 19, and the signal processor 20 of the above-mentioned Embodiment 1, an A/D converter 19A and a signal processor 20A in FIG. 10 are included.

The A/D converter 19A generates digital detection signals $DS_1$, $DS_2$, . . . , and $DS_K$ respectively corresponding to analog detection signals $CS_1$, $CS_2$, . . . , and $CS_K$ (receiving channels $CH_1$, $CH_2$, . . . , and $CH_K$) by sampling each of the analog detection signals $CS_1$, $CS_2$, . . . , and $CS_K$ at a predetermined sampling frequency, and outputs these digital detection signals $DS_1$, $DS_2$, . . . , and $DS_K$ to the signal processor 20A. As the A/D converter 19A, for example, a double integral type A/D converter, a successive approximation type A/D converter, or a parallel comparison type A/D converter can be used. The A/D converter 19A may generate digital detection signals $DS_1$, $DS_2$, . . . , and $DS_K$ by using a pulse trigger signal TS as a trigger and sampling the analog detection signal group CS in synchronization with the pulse trigger signal TS.

The signal processor 20A calculates signal spectra (integration spectra) $IS_1$, $IS_2$, . . . , and $IS_K$ of the digital detection signals $DS_1$, $DS_2$, . . . , and $DS_K$, and calculates signal-to-noise power ratios $R_1$, $R_2$, . . . , and $R_K$ of the digital detection signals $DS_1$, $DS_2$, . . . , and $DS_K$ on the basis of these signal spectra $IS_1$, $IS_2$, . . . , and $IS_K$. The signal processor 20A has a function of then selecting at least one signal spectrum from these signal spectra $IS_1$, $IS_2$, . . . , and $IS_K$ by using the signal-to-noise power ratios $R_1$, $R_2$, . . . , and $R_K$, and calculating observation quantities showing a state of a target on the basis of the selected at least one signal spectrum.

Figure 11:
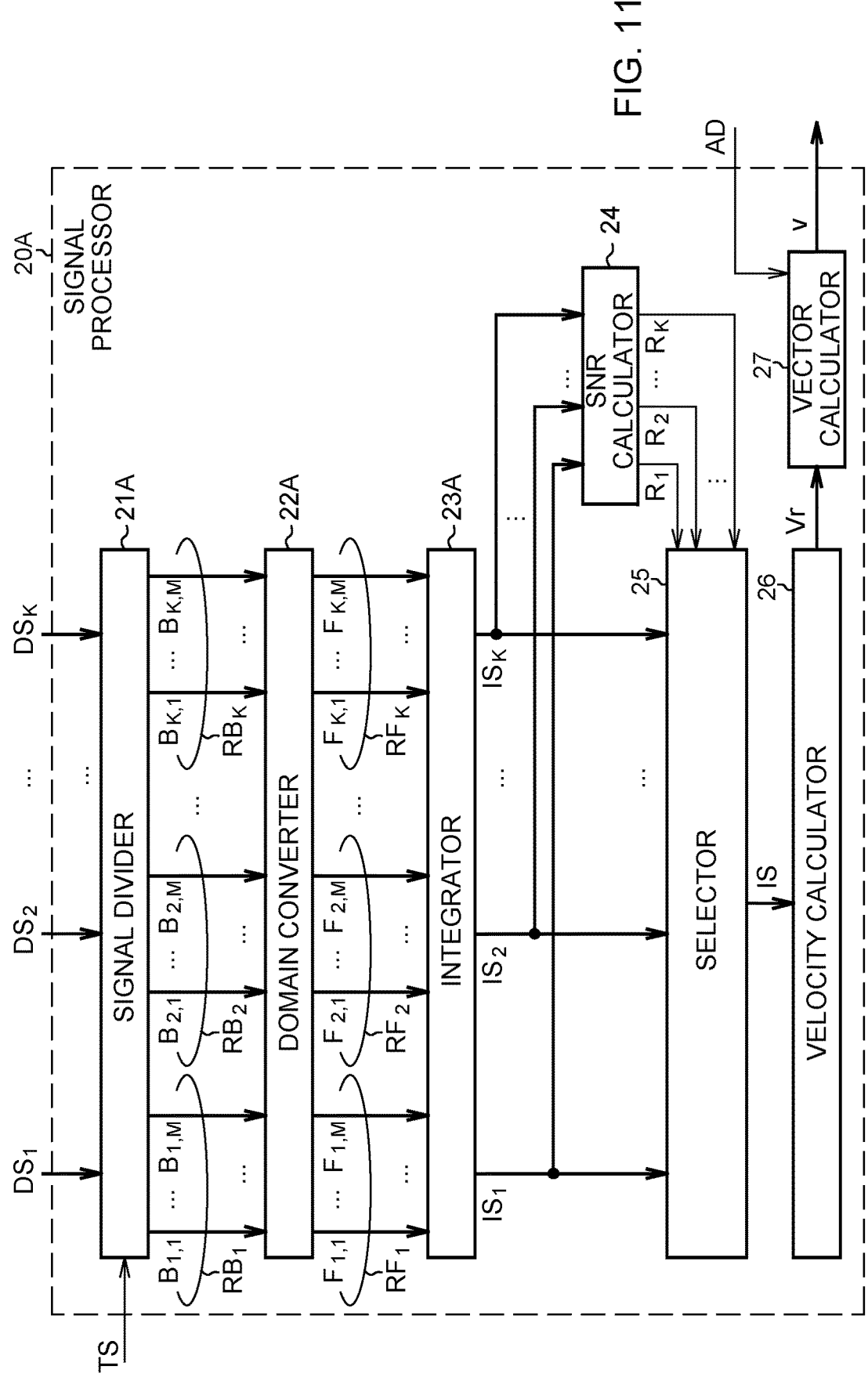
FIG. 11 is a block diagram schematically showing the configuration of a signal processor in the laser radar device of Embodiment 2.

FIG. 11 is a block diagram schematically showing an example of the configuration of the signal processor 20A in Embodiment 2. As shown in FIG. 11, the signal processor 20A includes a signal divider 21A, a domain converter 22A, an integrator 23A, an SNR calculator 24, a selector 25, a velocity calculator 26, and a vector calculator 27. The configuration of the signal processor 20A is the same as that of the signal processor 20 of Embodiment 1, with the exception that, instead of the signal divider 21, the domain converter 22, and the integrator 23 of Embodiment 1, a signal divider 21A, a domain converter 22A, an integrator 23A, an SNR calculator 24, and a selector 25 in FIG. 11 are included.

The signal divider 21A divides each digital detection signal $DS_k$ out of the digital detection signals $DS_1$, $DS_2$, . . . , and $DS_K$ acquired for each shot into M range bin signals (time domain signals) $B_{k,1}$, $B_{k,2}$, . . . , and $B_{k,M}$ respectively showing the signal waveforms of M gate time domains. The signal divider 21A outputs a range bin signal group $RB_k$ including the M range bin signals $B_{k,1}$, $B_{k,2}$, . . . , and $B_{k,M}$ for each receiving channel $CH_k$ to the domain converter 22A.

The domain converter 22A converts, as to each shot, each range bin signal group $RF_k$ out of the range bin signal groups $RF_1$, $RF_2$, . . . , and $RF_K$ into a frequency domain signal group $RF_k$ including M frequency domain signals $F_{k,1}$, . . . , and $F_{k,M}$, and outputs this frequency domain signal group $RF_k$ to the integrator 23A. More specifically, the domain converter 22A can calculate frequency domain signals $F_{k,1}$, $F_{k,2}$, . . . , and $F_{k,M}$ by performing a discrete Fourier transform on each of the range bin signals $B_{k,1}$, $B_{k,2}$, . . . , and $B_{k,M}$. As the discrete Fourier transform, a fast Fourier transform (FFT) with FFT bins whose number is $N_{FFT}$ (e.g., 256) can be used.

The integrator 23A calculates, as to each shot, an integration spectrum $IS_k$ on the basis of each frequency domain signal group $RF_k$, and outputs this integration spectrum $IS_k$ to the SNR calculator 24 and the selector 25.

Concretely, the integrator 23A calculates, as to each shot, a spectrum $S_k(m, n)$ of each of the range bin signals $B_{k,1}$, $B_{k,2}$, . . . , and $B_{k,M}$ on the basis of the frequency domain signals $F_{k,1}$, $F_{k,2}$, . . . , and $F_{k,M}$. Here, k is a receiving channel number (k=1 to K), m is a range bin number (m=1 to M), and n is a shot number (n=1 to N). N is the number of integrations that is specified by a user in advance. The spectrum S (k, m, n) should just be an amplitude spectrum or a power spectrum.

Further, the integrator 23A integrates, as to each range bin (range bin number m), the spectra $S_k(m, 1)$ to $S_k(m, N)$ in a direction of the shot number (performs incoherent integration) to calculate an integration signal spectrum $IS_k$ (m) with a high SNR. For example, as to the range bin $Rb_1$, the integrator 23A can calculate an integration signal spectrum $IS_k$ (1) with a high SNR by integrating the spectra $S_k$ (1, 1) to $S_k$ (1, N). When the result of this integration is averaged with the number N of integrations, the SNR is improved by a factor of $N^{1/2}$ for the number N of integrations. Although the incoherent integration is used in the integrator 23, coherent integration may be used instead of the incoherent integration.

In addition, the integrator 23A calculates an integration spectrum $IS_k$ by integrating the integration signal spectra $IS_k$ (1) to $IS_k$ (N), and outputs this integration spectrum $IS_k$ to the SNR calculator 24 and the selector 25.

The SNR calculator 24 calculates signal-to-noise power ratios $R_1$, $R_2$, . . . , and $R_K$ from the integration spectra $IS_1$, $IS_2$, . . . , and $IS_K$. A well-known method should just be used as a method of calculating the signal-to-noise power ratio $R_k$, with no limitation thereto intended. For example, the SNR calculator 24 can detect the peak value of the integration spectrum $IS_k$, and calculate, as the signal-to-noise power ratio $R_k$, the ratio of the peak value and a noise level measured in advance.

Figure 12:
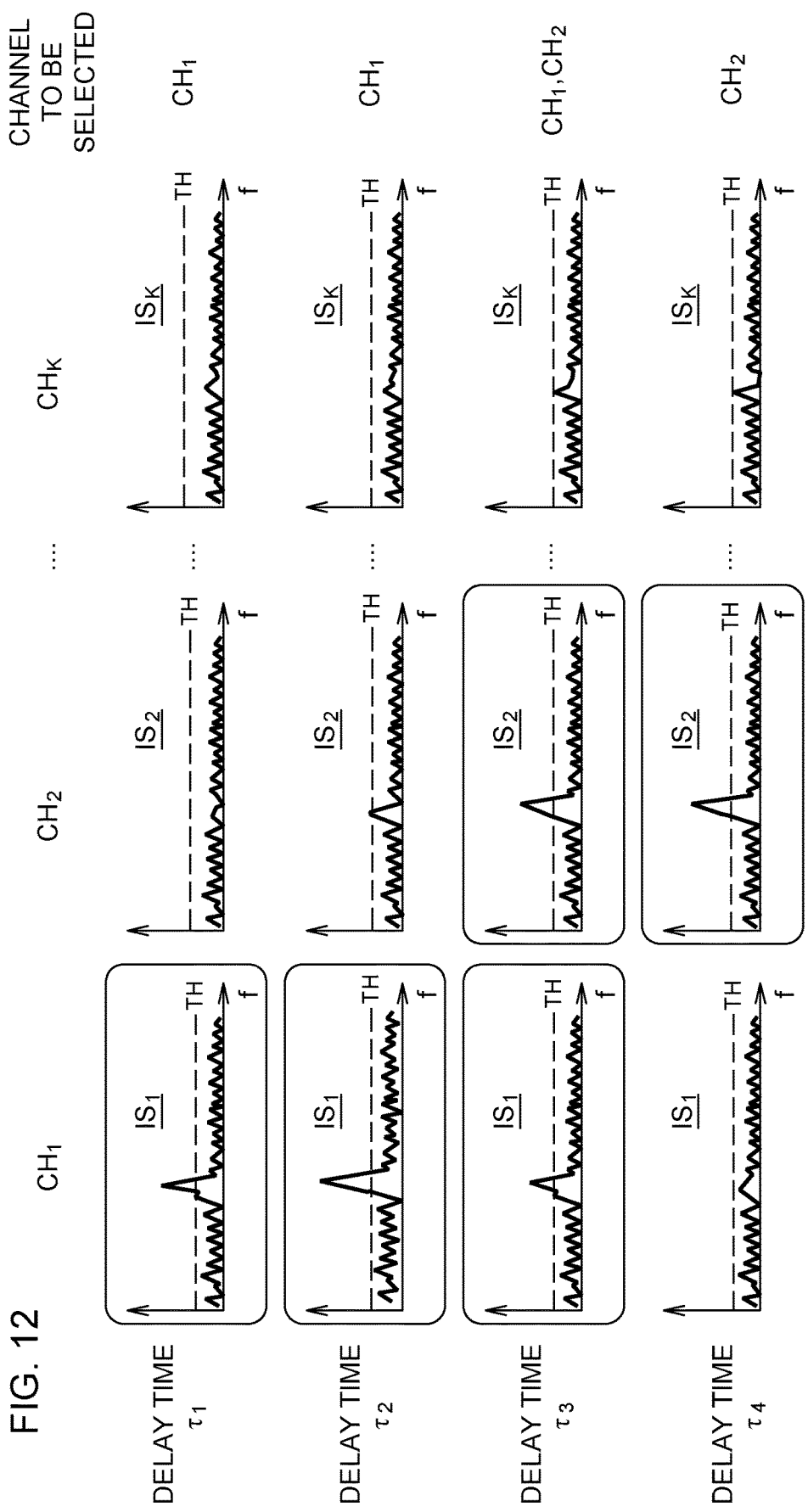
FIG. 12 is a diagram for explaining an example of a method of selecting a receiving channel according to Embodiment 2.

The selector 25 selects at least one integration spectrum with a high SNR from the integration spectra $IS_1$, $IS_2$, . . . , and $IS_K$ by using the signal-to-noise power ratios $R_1$, $R_2$, . . . , and $R_K$. When selecting one integration spectrum from the integration spectra $IS_1$, $IS_2$, . . . , and $IS_K$, the selector 25 outputs the selected integration spectrum as an integration spectrum IS, just as it is. In contrast, when selecting a plurality of integration spectra from the integration spectra $IS_1$, $IS_2$, . . . , and $IS_K$, the selector 25 calculates one integration spectrum IS by adding or averaging the selected integrated spectra, and outputs the integration spectrum IS to the velocity calculator 26. In the selector 25, the integration spectra $IS_1$, $IS_2$, ..., and $IS_K$ of the receiving channels $CH_1$, $CH_2$, ..., and $CH_K$ are inputted, as illustrated in FIG. 12. In order to compensate for an angular deviation corresponding to a delay time, the selector 25 selects a receiving channel that provides an integration spectrum including a frequency component exceeding a threshold TH, by using the signal-to-noise power ratios $R_1$, $R_2$, ..., and $R_K$. In the example of FIG. 12, in order to compensate for the angular deviation corresponding to the delay time $\tau_1$ or $\tau_2$, the selector 25 can select the receiving channel $CH_1$ and output the integration spectrum $IS_1$ of this receiving channel $CH_1$ as the integration spectrum IS. Further, in order to compensate for the angular deviation corresponding to the delay time $\tau_3$, the selector 25 can select the receiving channels $CH_1$ and $CH_2$, calculate a noise reduction spectrum by adding or averaging the integration spectra $IS_1$ and $IS_2$ of these receiving channels $CH_1$ and $CH_2$, and output this noise reduction spectrum as the integration spectrum IS. In addition, in order to compensate for the angular deviation corresponding to the delay time $\tau_4$, the selector 25 can select the receiving channel $CH_2$ and select the integration spectrum $IS_2$ of this receiving channel $CH_2$ as the integration spectrum IS.

As mentioned above, when the delay time is $\tau_3$, the selector 25 calculates a noise reduction spectrum by adding or averaging the plurality of selected integration spectra $IS_1$ and $IS_2$, and outputs this noise reduction spectrum, as the integration spectrum IS, to the velocity calculator 26. As a result, the SNR can be improved.

The velocity calculator 26 can detect the frequency at the peak position or the centroid position of the integration spectrum IS as a Doppler frequency $f_d$, and calculate a line-of-sight velocity Vr corresponding to angle information AD by using this Doppler frequency $f_d$. Further, the vector calculator 27 can calculate a velocity vector v of a target on the basis of the line-of-sight velocity Vr, by using a well-known vector combining method or a VAD method.

Although the line-of-sight velocity Vr and velocity vector v of a target are calculated as the observation quantities showing the state of the target in this embodiment, the calculated observation quantities are not limited to the line-of-sight velocity Vr and the velocity vector v. For example, the signal processor 20A may be configured so as to have a functional block that can calculate the distance (distance measurement value) between the laser radar device 2 and the target on the basis of the integration spectrum IS.

The hardware configuration of the above-mentioned signal processor 20A should just be implemented by, for example, a processor having a semiconductor integrated circuit such as a DSP, an ASIC, or an FPGA. As an alternative, the hardware configuration of the signal processor 20A may be implemented by a processor that executes a program code of software or firmware read from a memory and that includes an arithmetic device such as a CPU or a GPU. The functions of the signal processor 20A may be implemented using a signal processing device 40 shown in FIG. 6, just as in the case of Embodiment 1.

In the laser radar device 2 of Embodiment 2 explained above, the selector 25 can select at least one integration spectrum with a high SNR from the integration spectra $IS_1$, $IS_2$, ..., and $IS_K$ by using the signal-to-noise power ratios $R_1$, $R_2$, ..., and $R_K$. Further, when a plurality of integration spectra are selected from the integration spectra $IS_1$, $IS_2$, ..., and $IS_K$, the selector 25 can generate a noise reduction spectrum by adding or averaging the plurality of integration spectra. Therefore, even though an angle difference (angular deviation) resulting from a delay time occurs between the transmission direction of modulated transmission light $ML_k$ and the direction of arrival of scattered light at the optical antenna 14, an observation quantity showing a state of a target can be calculated on the basis of the integration spectrum or the noise reduction spectrum outputted from the selector 25 with a high degree of accuracy. In this embodiment, high-accuracy calculation of the observation quantity can be performed even in a situation in which it is difficult to grasp the angle difference (angular deviation).

Further, the laser radar device 2 of this embodiment can compensate for the angular deviation in a short response time without having to provide a structural configuration for compensating for the angle difference as disclosed in the above-mentioned Patent Literature 1, just as in the case of the above-mentioned Embodiment 1. Therefore, because the integration spectrum IS with a high SNR is acquired even though the distance to the target is short, the observation quantity can be calculated with a high degree of accuracy.

Embodiment 3

Figure 13:
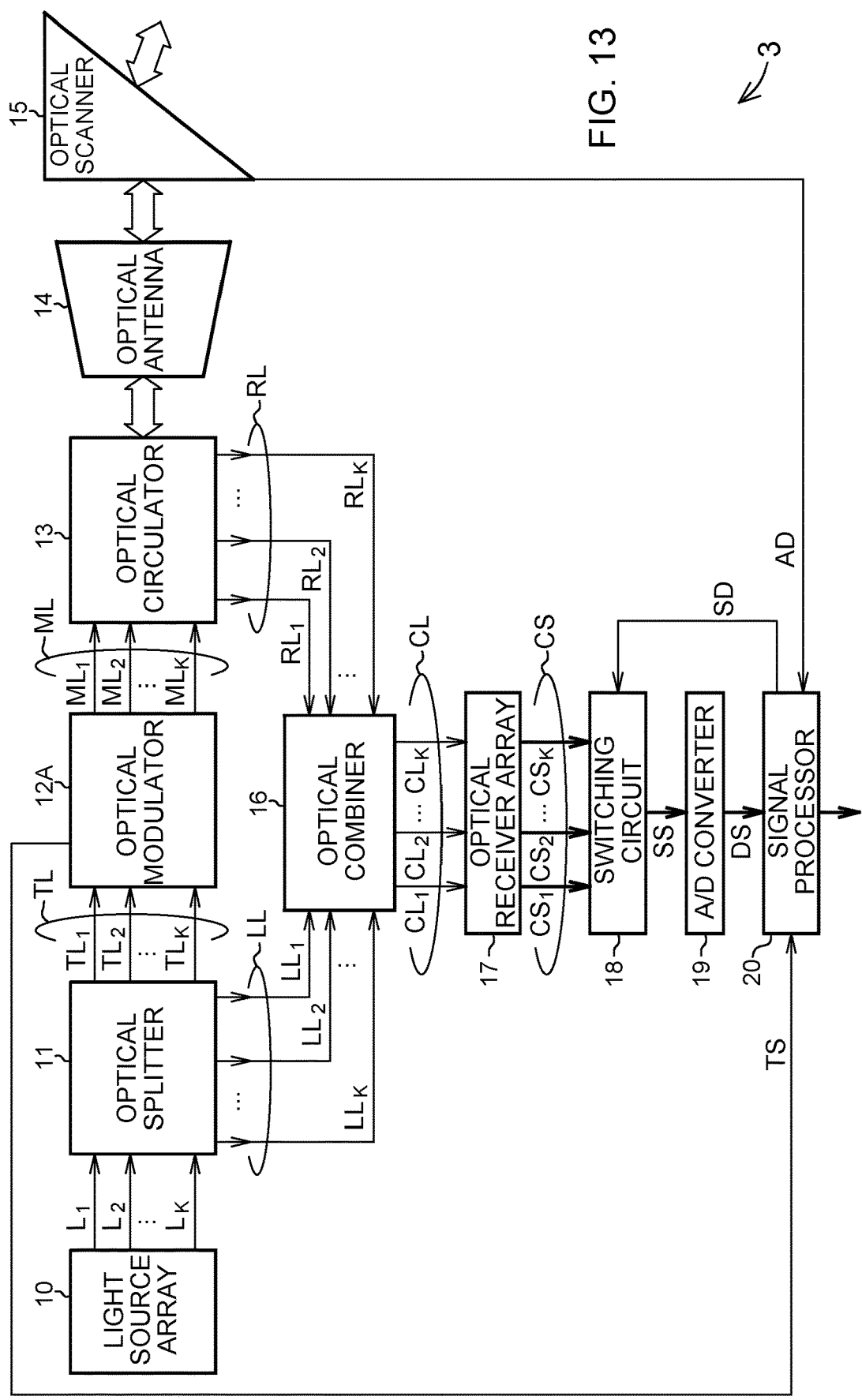
FIG. 13 is a block diagram showing the schematic configuration of a laser radar device of Embodiment 3 according to the present invention.

FIG. 13 is a block diagram showing the schematic configuration of a laser radar device 3 of Embodiment 3 according to the present invention. The configuration of the laser radar device 3 shown in FIG. 13 is the same as that of the laser radar device 1 of the above-mentioned Embodiment 1, with the exception that, instead of the optical modulator 12 of the above-mentioned Embodiment 1, an optical modulator 12A in FIG. 13 is provided.

The optical modulator 12A of this embodiment performs frequency modulation and intensity modulation on transmission light TL inputted from an optical splitter 11, thereby shifting the frequency of the transmission light TL and pulsing the transmission light TL. The optical modulator 12A generates modulated transmission light ML (a series of pulse light beams) including a plurality of modulated light components $ML_1$ to $ML_K$ and having a predetermined pulse width T at a predetermined PRF by performing the frequency modulation and the intensity modulation, and outputs the modulated transmission light ML to an optical circulator 13. Further, the optical modulator 12A outputs a pulse trigger signal TS generated for the pulsing of the transmission light TL to a signal processor 20. The pulse trigger signal TS shows the timing of the pulsing of the transmission light TL.

As previously explained, in this embodiment, the optical splitter 11 outputs a plurality of transmission light components $TL_1$ to $TL_x$ to the optical modulator 12A, and the optical modulator 12A generates modulated transmission light ML including a plurality of modulated light components $ML_1$ to $ML_K$ by performing the frequency modulation and the intensity modulation on these transmission light components $TL_1$ to $TL_K$. Therefore, an optical antenna 14 can transmit the modulated transmission light ML having a large beam diameter and a large beam divergence via an optical scanner 15. Therefore, the receiving aperture D of the optical antenna 14 can be improved, and the SNR of a reception signal can also be improved, as will be explained below.

More specifically, the SNR of the reception signal (analog detection signal CS) can be improved by the square ($=D^2$) of the receiving aperture D, as described in Nonpatent Literature (S. Kameyama et al., Applied Optics, Vol. 46, No. 11, pp. 1953-1962, 2007). The receiving aperture D is defined as $D=NA \times f$, where the focal length of a lens is f, and the numerical aperture of an optical receiving element is NA.

The longer f, the larger the receiving aperture D. On the other hand, because the receiving field of view α is simply defined as α=d/f, where the element aperture of the receiver is d, the receiving field of view α decreases as f is increased with d being kept constant.

In this embodiment, both the values of the receiving aperture D and the receiving field of view α of the optical antenna 14 (the element aperture is $d_a = d \times N_a$ when the number of arrays is $N_a$) can be improved using an optical receiver array 17. In this embodiment, the modulated transmission light ML having a beam diameter and a beam divergence that are substantially the same as the receiving field of view of the optical antenna 14 can be transmitted. Therefore, the receiving aperture D of the optical antenna 14 can be improved, and the SNR of the reception signal (analog detection signal CS) can also be improved.

Further, because the optical receiver array 17 makes it possible to ensure a large receiving field of view and a large receiving aperture even in a case of using a heterodyne detection method that can only receive single-mode laser light, the SNR can be improved.

Embodiment 4

Figure 14:
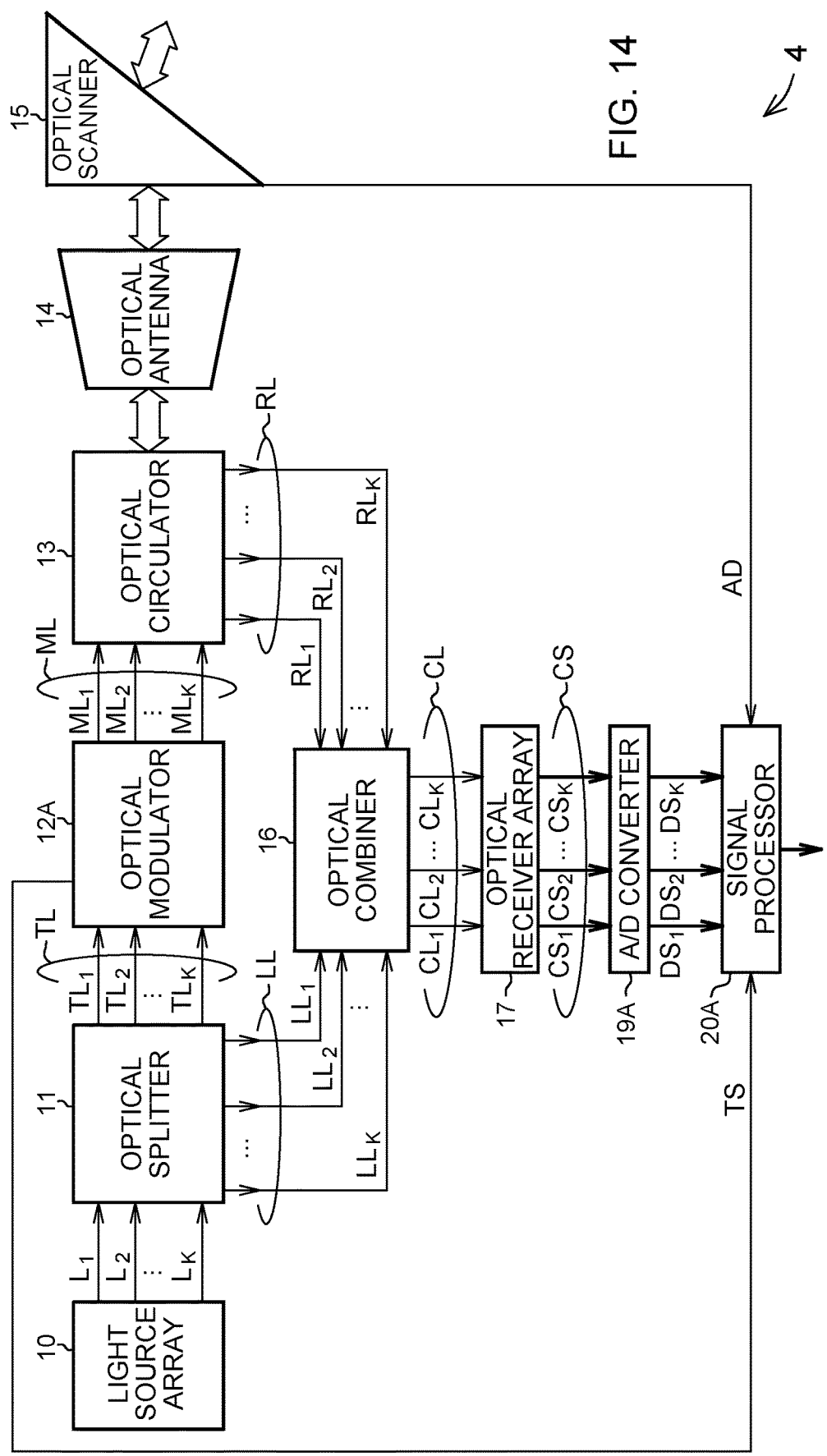
FIG. 14 is a block diagram showing the schematic configuration of a laser radar device of Embodiment 4 according to the present invention.

FIG. 14 is a block diagram showing the schematic configuration of a laser radar device 4 that is Embodiment 4 according to the present invention. The configuration of the laser radar device 4 shown in FIG. 14 is the same as that of the laser radar device 2 of the above-mentioned Embodiment 2, with the exception that, instead of the optical modulator 12 of the above-mentioned Embodiment 2, an optical modulator 12A in FIG. 14 is included.

The optical modulator 12A of this embodiment outputs modulated transmission light ML (a series of pulsed light beams) including a plurality of modulated light components $ML_1$ to $ML_K$ to an optical circulator 13 by performing frequency modulation and intensity modulation on transmission light TL inputted from an optical splitter 11, just as in the case of the above-mentioned Embodiment 3. Further, the optical modulator 12A outputs a pulse trigger signal TS to a signal processor 20.

Therefore, the modulated transmission light ML having a beam diameter and a beam divergence that are substantially the same as the receiving field of view of an optical antenna 14 can be transmitted, just as in the case of the above-mentioned Embodiment 3. Therefore, the receiving aperture D of the optical antenna 14 can be improved, and the SNR of a reception signal (analog detection signal CS) can also be improved.

Variations of Embodiments 1 to 4

Although the various embodiments of the present invention are described with reference to the drawings, as explained, these embodiments exemplify the present invention, and various embodiments other than these embodiments can also be used. For example, although the pulse-type laser radar devices 1 to 4 that use pulse waves as the transmission light are shown in above-mentioned Embodiments 1 to 4, no limitation thereto is intended. A continuous wave (CW) type that uses CW laser light as the transmission light may be applied to the above-mentioned laser radar devices 1 to 4.

Further, although in above-mentioned Embodiments 1 to 4 the space propagation structure is described as means for optically connecting the optical components, as shown in FIG. 2, no limitation thereto is intended. Instead of the space propagation structure, an optical waveguide structure that uses optical fibers may be used.

Further, although in above-mentioned Embodiments 1 to 4 the velocity vector v is measured as an observation quantity, the observation quantity is not limited to the velocity vector v. For example, the configuration of each of the signal processors 20 and 20A may be changed as appropriate in such a way as to be able to calculate the moving speed or the distance measurement value of a hard target such as a structure or a geographical object, by using the integration spectrum IS.

Further, although in above-mentioned Embodiments 1 to 4 the external space is scanned using the optical scanner 15, the method of scanning the external space is not limited to the method of using the optical scanner 15. For example, a method of scanning the external space with a laser beam emitted from a moving object such as an airplane or a vehicle as the moving object moves may be used. In this case, the configuration of each of the signal processors 20 and 20A should just be changed as appropriate in such a way as to calculate an observation quantity by using, instead of the angle information AD, a relative moving speed of the moving object with respect to the external space.

It is to be understood that an arbitrary combination of two or more of the above-mentioned Embodiments 1 to 4 can be made, a change can be made in an arbitrary component of any of the embodiments, or an arbitrary component of any of the embodiments can be omitted within the scope of the present invention.

INDUSTRIAL APPLICABILITY

The laser radar device according to the present invention is suitable for use in laser sensor systems including observation systems that observe an atmospheric state by using laser light, such as three-dimensional measurement systems that measure the shape of an observation object.

REFERENCE SIGNS LIST 1 to 4: a laser radar device; 10: a light source array; 101: a reference light source; 102: an optical splitting element; 11: an optical splitter; 111: a light guide optical system; 112: abeam splitter; 12, 12A: optical modulators; 13: an optical circulator; 131: a beam splitter; 132: a wavelength plate; 14: an optical antenna; 15: an optical scanner; 151: a rotor; 152: a wedge prism; 153: a rotation driving unit; 16: an optical combiner; 161: a beam splitter; 162: a reflecting mirror; 163, 164: condensing optical systems; 17: an optical receiver array; 18: a switching circuit; 181: a first switch; 182: a second switch; 183: an adder; 184: a channel selecting circuit; 19, 19A: A/D converters; 20, 20A: signal processors; 21, 21A: signal dividers; 22, 22A: domain converters; 23, 23A: an integrators; 24: an SNR calculator; 25: a selector; 26: a velocity calculator; 27: a vector calculator; 28: a scanning speed calculator; 40: a signal processing device; 41: a processor; 42: a memory; 43: an input interface unit; 44: an output interface unit; 45: a signal path; Da1 to Da3, Db1 to Db3: optical receiving elements; and E1 to E3: light emitting ends.

The invention claimed is:

1. A laser radar device comprising:
a light source array having a single reference light source configured to emit a reference laser beam, an optical splitting element configured to split the reference laser beam into a plurality of laser light beams, and a plurality of light emitting ends, the light source array being configured to simultaneously emit the plurality of laser light beams from the plurality of light emitting ends, respectively;

an optical splitter configured to separate a plurality of transmission light components from the plurality of laser light beams, respectively, and configured to separate a plurality of local light components from the plurality of laser light beams, respectively;

an optical modulator configured to modulate one of the transmission light components to generate modulated transmission light;

a transmission/reception optical system configured to receive, as received light, the modulated transmission light reflected by a target existing in external space, while scanning the external space with the modulated transmission light;

an optical combiner configured to generate a plurality of interference light components by combining the received light and the plurality of local light components;

an optical receiver array including a plurality of optical receivers arranged at respective positions that optically correspond to different receiving fields of view of the transmission/reception optical system, and configured to generate a plurality of detection signals by detecting the plurality of interference light components;

a switching circuit configured to select a detection signal from among the plurality of detection signals corresponding to the different receiving fields of view, in accordance with a scanning speed of the transmission/reception optical system with respect to the external space; and a signal processor configured to calculate a signal spectrum of the selected detection signal, and calculate an observation quantity including a velocity vector of the target on a basis of the signal spectrum, wherein the signal processor includes:

a signal divider configured to divide the detection signal selected by the switching circuit into a plurality of time domain signals indicating respective signal waveforms of a plurality of gate time domains;

a domain converter configured to convert the plurality of time domain signals into a plurality of frequency domain signals, respectively;

an integrator configured to calculate a plurality of spectra of the plurality of the time domain signals from the plurality of frequency domain signals, and calculate the signal spectrum by integrating the plurality of spectra; and an observation quantity calculator configured to calculate the observation quantity on a basis of the signal spectrum.

2. A laser radar device comprising:

a light source array having a single reference light source configured to emit a reference laser beam, an optical splitting element configured to split the reference laser beam into a plurality of laser light beams, and a plurality of light emitting ends, the light source array being configured to simultaneously emit the plurality of laser light beams from the plurality of light emitting ends, respectively;

an optical splitter configured to separate a plurality of transmission light components from the plurality of laser light beams, respectively, and configured to separate a plurality of local light components from the plurality of laser light beams, respectively;

an optical modulator configured to modulate one of the transmission light components to generate modulated transmission light;

a transmission/reception optical system configured to receive, as received light, the modulated transmission light reflected by a target existing in external space, while scanning the external space with the modulated transmission light;

an optical combiner configured to generate a plurality of interference light components by combining the received light and the plurality of local light components;

an optical receiver array including a plurality of optical receivers arranged at respective positions that optically correspond to a plurality of different receiving fields of view of the transmission/reception optical system, and configured to generate a plurality of detection signals by detecting the plurality of interference light components;

a signal processor configured to calculate a plurality of signal spectra of the plurality of detection signals, and calculate a plurality of signal-to-noise power ratios of the plurality of detection signals, wherein the signal processor includes:

a signal divider configured to divide each of the plurality of detection signals into a plurality of time domain signals indicating signal waveforms of a plurality of gate time domains;

a domain converter configured to, for each of the plurality of detection signals, convert the plurality of time domain signals into a plurality of frequency domain signals, respectively;

an integrator configured to, for each of the plurality of detection signals, calculate a plurality of spectra of the plurality of time domain signals from the plurality of frequency domain signals, and calculate, as the plurality of signal spectra, a plurality of integration spectra corresponding to the plurality of detection signals by integrating the calculated plurality of spectra;

an SNR calculator configured to calculate the plurality of signal-to-noise power ratios from the plurality of integration spectra, respectively;

a selector configured to select at least two integration spectra from among the plurality of integration spectra by using the plurality of signal-to-noise power ratios, and calculate a noise reduction spectrum by adding or averaging the at least two signal spectra; and an observation quantity calculator configured to calculate observation quantities including a line-of-sight velocity and a velocity vector of the target on a basis of the noise reduction spectrum that is calculated by the selector.

* * * * *